United States Patent
Spinella

(10) Patent No.: US 10,541,566 B2
(45) Date of Patent: Jan. 21, 2020

(54) SYSTEM FOR WIRELESSLY TRANSFERRING ELECTRICAL POWER

(71) Applicant: EGGTRONIC ENGINEERING S.R.L., Modena (IT)

(72) Inventor: Igor Spinella, Modena (IT)

(73) Assignee: EGGTRONIC ENGINEERING S.R.L., Modena (IT)

(*) Notice: Subject to any disclaimer, the term of this patent is extended or adjusted under 35 U.S.C. 154(b) by 0 days.

(21) Appl. No.: 16/472,642

(22) PCT Filed: Oct. 18, 2017

(86) PCT No.: PCT/IB2017/056472
§ 371 (c)(1),
(2) Date: Jun. 21, 2019

(87) PCT Pub. No.: WO2018/115990
PCT Pub. Date: Jun. 28, 2018

(65) Prior Publication Data
US 2019/0363586 A1 Nov. 28, 2019

(30) Foreign Application Priority Data
Dec. 22, 2016 (IT) .................. 102016000130095

(51) Int. Cl.
*H02J 50/40* (2016.01)
*H02J 50/12* (2016.01)

(52) U.S. Cl.
CPC .............. *H02J 50/40* (2016.02); *H02J 50/12* (2016.02)

(58) Field of Classification Search
CPC .................................. H02J 50/40; H02J 50/12
See application file for complete search history.

(56) References Cited

U.S. PATENT DOCUMENTS

2013/0127254 A1 5/2013 Miichi et al.

FOREIGN PATENT DOCUMENTS

| EP | 2555378 A1 | 2/2013 |
| JP | 2013034291 A | 2/2013 |
| WO | 2015198123 A1 | 12/2015 |

*Primary Examiner* — Robert L Deberadinis
(74) *Attorney, Agent, or Firm* — Browdy and Neimark, PLLC

(57) ABSTRACT

An embodiment of the present invention provides a system (100) for wirelessly transferring electrical power to an electrical load (115) comprising: a feeding device (105) and a device to be fed (110) physically separate and independent from the feeding device; wherein the device to be fed (110) comprises: the electrical load to be fed, a control circuit (125) adapted for generating a clock signal, and a receiving apparatus (120) of the electrical power connected to the electrical load (115); and wherein the feeding device (105) comprises at least one transmission group (135) of the electrical power that includes: a transmitting apparatus (145) adapted for making a non-conductive electrical coupling with the receiving apparatus (120) of the device to be fed (110), a signal management circuit (150) adapted for receiving the clock signal generated by the control circuit (125) of the device to be fed (110) and for generating a pilot signal having a frequency proportional to the frequency of the clock signal, and a power circuit (155) adapted for receiving the pilot signal generated by the signal management circuit (150) and for applying to the transmitting apparatus (145) a voltage wave that is periodically variable over time with a frequency equal to the frequency of the pilot signal.

19 Claims, 22 Drawing Sheets

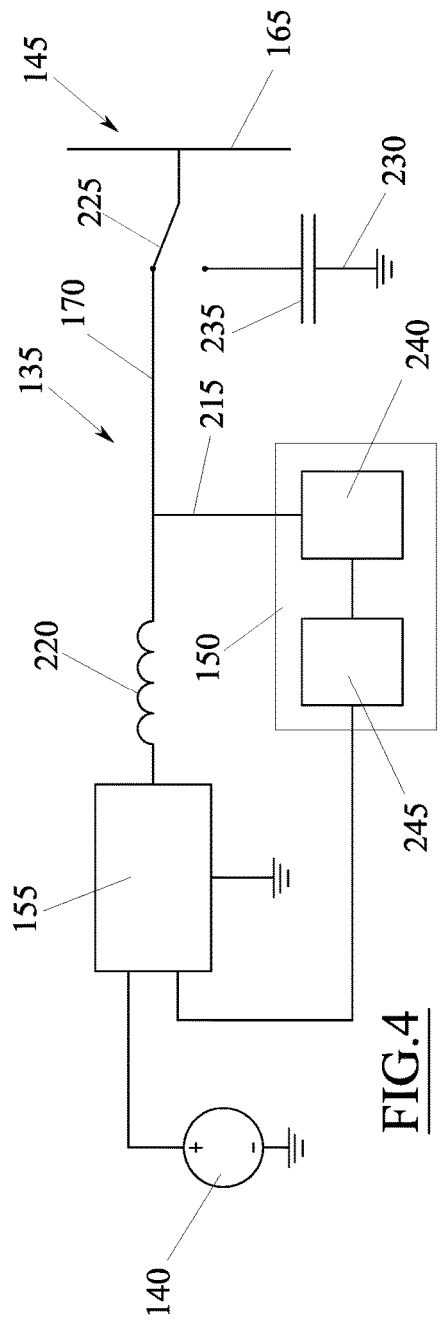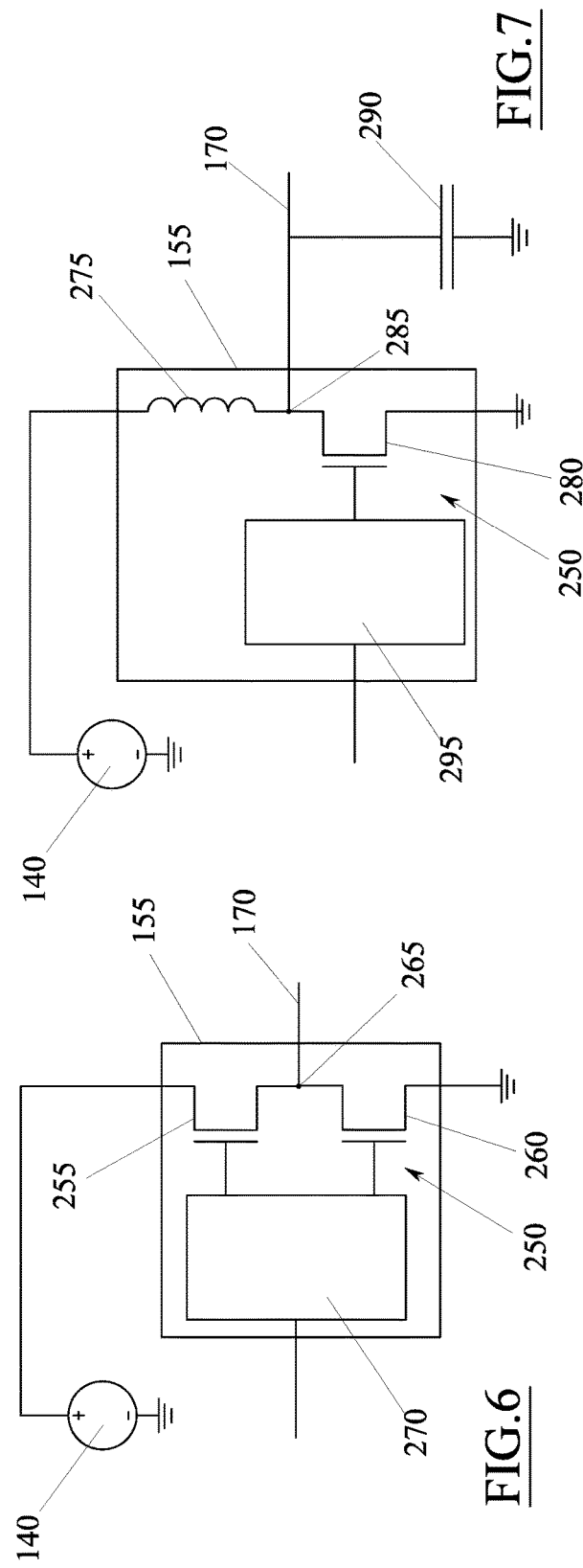

SYSTEM FOR WIRELESSLY TRANSFERRING ELECTRICAL POWER

TECHNICAL FIELD

The present invention in general concerns a system for wirelessly feeding and/or recharging one or more electrical loads. Such electrical loads can for example be electrical/electronic devices that must be fed electrically to allow the operation thereof and/or to charge the internal batteries of the device itself. Classical examples of this type of electrical/electronic device are mobile telephones, tablets, computers, televisions, lighting systems, for example using LEDs, and many others.

PRIOR ART

The systems currently known for transferring electrical power to a load in wireless mode are generally based on making an inductive or capacitive coupling between a receiving apparatus arranged on the device to be fed/recharged and a transmission apparatus arranged on a corresponding feeding device.

In systems based on inductive coupling, a transmission antenna is typically used arranged on the feeding device, for example having the shape of a reel or of a coil, and a receiving antenna is used arranged on the device to be fed. In this way, even without a galvanic connection between transmission apparatus and receiving apparatus, it is possible to feed electrical and electronic devices of various kinds.

As far as systems based on capacitive coupling are concerned, transmitting armatures are used, arranged on the feeding device, for example made with conductive areas possibly insulated from the outside through dielectric material, which face analogous receiving armatures arranged on the device to be fed, therefore constituting at least two electrical capacities. By applying in input to such electrical capacities a voltage wave having a sufficiently high frequency, it is possible to transmit to the load an electrical power sufficient to feed it.

A common problem in short range feeding/recharging systems, both of the inductive and capacitive type, consists of having to position the device to be fed/recharged in a precise position with respect to the relative feeding device. In the case of inductive systems, this problem can be solved by creating transmission antennae capable of generating a magnetic induction field in a very wide area of space (for example with reels of greater dimensions), but such an approach substantially worsens the energy efficiency of the system, reduces the transmissible power and increases electromagnetic pollution.

These problems can be partially reduced by equipping the feeding device with a plurality of antennae having smaller dimensions, each fed by a power circuit independent from the others and possibly positioned so as to ensure a partial overlapping between the magnetic fields generated by them. This solution, however, determines a substantial worsening of the costs and of the bulk of the system and in any case does not eliminate the problems of low energy efficiency that characterise inductive systems.

Capacitive systems, although ensuring greater energy efficiency, need a correct alignment between the device to be fed and the feeding device, otherwise there is generally a substantial degradation of performance.

In order to at least partially tackle this drawback it is possible to use multiple small armatures arranged according to a matrix design, each of which is connected to a corresponding power circuit independently from the others. Each solution based on the multiplication of the transmitting elements, both of the inductive type (coil) and of the capacitive type (armature), nevertheless has the drawback of requiring the generation of a clock signal, typically at high frequency (for example MHz, tens of MHz or hundreds of MHz in the case of capacitive armatures and RF inductive systems), which allows the power circuit of each transmitting element to be driven effectively.

In order to meet such a need it is possible to provide a clock generator (e.g. an oscillator) for each power circuit of each transmitting element, but this results in a particularly great worsening of the costs, particularly in the case in which the feeding device must provide a very large transmission area and/or is equipped with a very large number of transmitting elements.

Alternatively, it is possible to use a single clock generator shared by all of the power circuits of the transmitting elements (or in any case a smaller number of clock generators than the number of power circuits) and distribute the clock signal through a suitable bus. This, however, involves a series of drawbacks, including in particular the need to transmit high frequency signals over long distances, typically through transmission lines, thus with problems of impedance matching, attenuations and reflections, lower speeds linked to the characteristic impedance of the line, buffer requirements to regenerate the signal, and greater losses. These problems are then added to by the substantial drawback of not being able to create a feeding device in which each transmitting element is totally independent from the others.

A purpose of the present invention is therefore to overcome the highlighted limitations, and in particular to make a system for wirelessly transmitting electrical power capable of independently feeding devices arranged randomly close to a feeding device, ensuring easy control of the transmitting elements, in particular foreseeing a system capable of driving each transmitting element independently from the others, without the need to arrange multiple clock generators in the feeding device and therefore drastically reducing the costs of wireless power transmission technology.

This and other purposes are accomplished by the characteristics of the invention as given in the independent claims. The dependent claims outline preferred and/or particularly advantageous aspects of the various embodiments of the invention.

PRESENTATION OF THE INVENTION

Considering what has been outlined, the present invention provides a system for wirelessly transferring electrical power to an electrical load, the base scheme of which comprises:
  a feeding device and
  a device to be fed physically separate and independent from the feeding device.

In general, the device to be fed is any device that can be freely moved in space independently from the feeding device, for example it can be brought towards and away from the latter, without any type of physical constraint between the two devices. In other words, the device to be fed is not connected to the feeding device by any mechanical component, like for example a cable or whatever other mechanical connection system, either fixed or removable. As an example, the device to be fed can be a mobile telephone, a tablet, a computer, a television, a lighting system, for example using LEDs, a home appliance device, a wearable device, an IOT device or any other electrical/electronic device that needs an electrical power supply.

According to the invention, the device to be fed comprises:
- the electrical load to be fed,
- a control circuit adapted for generating a clock signal, and
- a receiving apparatus of the electrical power connected to the electrical load.

The feeding device comprises at least one transmission group of the electrical power that includes:
- a transmitting apparatus adapted for making a non-conductive magnetic and/or electric coupling, for example an inductive, capacitive or inductive and capacitive hybrid coupling, with the receiving apparatus of the device to be fed,
- a signal management circuit adapted for receiving the clock signal generated by the control circuit of the device to be fed and for generating a pilot signal having a frequency proportional to the frequency of the clock signal, and
- a power circuit adapted for receiving the pilot signal generated by the signal management circuit and for applying to the transmitting apparatus a voltage wave that is periodically variable over time with a frequency equal to the frequency of the pilot signal.

Thanks to this solution, the driving of each power circuit of the feeding device is effectively obtained by exploiting the clock signal generated by the control circuit arranged on the device to be fed, so that the feeding device does not need any generator of the clock signal. Since the device to be fed, which as stated can be a mobile telephone, a tablet, a computer or similar, is generally already equipped with a control circuit adapted for generating high frequency clock signals for its operation, as a result this solution obtains a drastic reduction of the costs necessary for implementing wireless power transmission technology.

According to an aspect of the present invention, the feeding device can comprise a plurality of transmission groups, each of which is equipped with a corresponding transmitting apparatus, or signal management circuit and power circuit.

Thanks to this solution a high flexibility of use is advantageously obtained. For example, having a large number of transmission groups it is advantageously possible to arrange the transmitting apparatuses so as to be able to feed the load for different relative positions of the device to be fed with respect to the feeding device. In particular, it is possible to arrange the transmitting apparatuses according to a matrix distribution, making an active surface in the feeding device, on which the device to be fed can be rested in multiple positions and different orientations. In each of these positions, the transmitting apparatuses that are close to the device to be fed will thus be capable of effectively feeding the load, whereas the transmitting apparatuses that are not involved in the transmission of electrical power can be kept switched off, reducing the electrical losses and the electromagnetic pollution. Another advantage of this solution consists of the possibility of simultaneously and independently feeding multiple devices, which can be variously arranged on the aforementioned active surface of the same feeding device. The fact that each transmission apparatus is connected to its own signal management circuit and to its own power circuit, also makes the feeding device resistant to localised damage, which at most can destroy a single transmission group, leaving the global system completely in operation. Thanks to this special feature, the feeding device can possibly be made in the form of a mat able to be cut as desired, so as to give it any shape useful for use. For example, the aforementioned mat could be cut and applied to a desk or a wall, where it can be fixed with any known system without compromising the functionality thereof.

According to an embodiment of the present invention, the transmitting apparatus of each transmission group can comprise:
- at least one transmitting armature connected to the corresponding power circuit and to the corresponding signal management circuit, and the receiving apparatus of the device to be fed can comprise:
- a first receiving armature adapted for facing the transmitting armature of a first transmission group to make a first electrical capacity,
- a second receiving armature adapted for facing the transmitting armature of a second transmission group to make a second electrical capacity.

Thanks to this solution an effective capacitive coupling is made that makes it possible to transfer electrical power between the feeding device and the device to be fed. In order to allow this transfer of electrical power, the power circuit connected to the transmitting armature of the first transmission group, hereinafter called simply "first transmitting armature", can be driven so as to apply to such an armature a voltage wave having frequency proportional to the clock signal received by the device to be fed, whereas the transmitting armature of the second transmission group, hereinafter simply called "second transmitting armature", can be referred to a reference potential (e.g. ground). In this way, between the first and the second coupling capacity a voltage difference is made that is variable over time capable of feeding the load arranged on the device to be fed. Alternatively, the transfer of electrical power can be obtained by driving the power circuit of the first transmitting armature to generate the aforementioned voltage wave and driving the power circuit of the second transmitting armature to generate a voltage wave having the same frequency but dephased with respect to that applied to the first transmitting armature, preferably a voltage wave in counter-phase with respect to that applied to the first transmitting armature.

According to an aspect of this embodiment of the invention, the control circuit of the device to be fed can be connected to the first receiving armature to apply to said first receiving armature the clock signal, and the signal management circuit of each transmitting apparatus of the feeding device can be connected to the corresponding transmitting armature to receive the clock signal.

In this way, the clock signal generated by the device to be fed can be advantageously captured through the same capacitive coupling that also allows the transfer of power, simplifying and rationalising the feeding device. In practice, whereas the voltage wave crosses the capacitive coupling from the feeding device towards the device to be fed, the clock signal, generally having a much higher frequency than the voltage wave, crosses the capacitive or reverse coupling from the device to be fed towards the feeding device, where it can be used to drive the power circuit.

However, this does not rule out the possibility that, in other embodiments, it is possible to create an independent capacitive coupling, through small armatures arranged close to the main armatures, in order to separate the voltage waves from the clock signal, thus simplifying possible filtering operations. The capturing of the clock signal can take place at the same time as the generation and application of the voltage wave, or it can occur during the short steps in which the generation of the voltage wave is suspended and in which there is thus no transmission of power. In this last case, the clock signal can be used to charge suitable buffers that, during the subsequent power transmission step, are capable of generating a pilot signal having a frequency proportional to the clock signal previously captured.

According to an aspect of the invention, the device to be fed can also comprise:
- an inductance connected in series between the first receiving armature and the electrical load, and
- a capacity connected in series between the first receiving armature and the control circuit.

The inductance operates substantially as a low pass filter that allows the voltage wave coming from the feeding device to reach the electrical load, but prevents the passage of the clock signal generated by the control circuit, which is thus forced to pass from the device to be fed towards the feeding device. The capacity, on the other hand, operates as a high pass filter that allows the clock signal to reach the first receiving armature but prevents the passage of the voltage wave, which thus cannot reach the control circuit. Each transmission group of the feeding device can in turn comprise an inductance connected in series between the corresponding power circuit and the corresponding transmitting armature.

This inductance, operating substantially as a low pass filter, allows the voltage wave to reach the transmitting armature but prevents the clock signal coming from the device to be recharged from reaching the power circuit.

A further aspect of the invention foresees that each transmission group of the feeding device can comprise an activation switch adapted for selectively connecting the transmitting armature to the corresponding power circuit and to the corresponding signal management circuit or to a reference potential (e.g. ground).

In other words, this activation switch can be selectively switched between a closed configuration, wherein it connects the transmitting armature to ground or to another reference potential, and an open configuration, wherein it connect the transmitting armature to the relative power circuit and to the relative signal management circuit.

Thanks to this solution, the activation switch can be advantageously used to automatically activate each transmission group at the moment in which the corresponding transmitting armature couples with the first receiving armature of a device to be fed.

For example, the activation switch can be kept normally in closed position, so that the transmitting armature is completely insulated both from the power circuit and from the signal management circuit. In this configuration, the signal management circuit is not capable of receiving any clock signal nor possible disturbances that could cause the accidental activation of the power circuit, which thus remains completely switched off, reducing the energy consumption and the electromagnetic pollution of the feeding device. From this configuration, the switch can be periodically brought into open configuration for short instants, connecting the transmitting armature to the power circuit and to the signal management circuit. During these short instants, if the transmitting armature does not face the first receiving armature of a device to be recharged (i.e. there is no device to be fed present), the signal management circuit will in any case not receive any clock signal, so that the power circuit will remain switched off and the activation switch can be brought into closed configuration. Vice-versa, if at the opening of the activation switch the transmitting armature faces the first receiving armature of a device to be fed, the signal management circuit will automatically receive the clock signal and will command the power circuit to feed the transmitting armature and consequently the load. In this case, the activation switch can be kept in open configuration so long as the signal management circuit continues to receive the clock signal.

According to another aspect of the invention, each transmission group of the feeding device can comprise a plurality of transmitting armatures connected to the same power circuit and to the same signal management circuit. Thanks to this solution it is advantageously possible to significantly increase the number of transmitting armatures, without an excessive increase in the power and signal management circuits, thereby keeping the costs under control. Such a multiplication of the number of transmitting armatures in turn has the advantage of allowing a reduction of the size of each of them, which can therefore be arranged to make a very densely divided transmitting surface that makes it possible to obtain a very precise capacitive coupling with the receiving armatures, allowing the transmission of power substantially for any position of the device to be fed and reducing the electromagnetic emissions.

According to another embodiment of the invention, the transmitting apparatus of each transmission group can comprise:
- at least one transmitting inductive element connected to the power circuit, whereas the receiving apparatus of the device to be fed can comprise:
- at least one inductive receiving element connected to the electrical load and adapted for making an inductive coupling with the transmitting inductor of the feeding device.

Thanks to this solution, the transfer of electrical power between the feeding device and the device to be fed can be effectively carried out inductively. Concerning this, it should be specified that each transmitting apparatus of the feeding device could comprise only transmitting elements of the inductive type (one or more inductive transmitting elements), in this way carrying out a purely inductive transmission of electrical power.

Alternatively, each transmitting apparatus of the feeding device could comprise only capacitive transmitting elements (one or more transmitting armatures), in this way carrying out a purely capacitive transmission of electrical power.

Another alternative finally foresees that each transmitting apparatus of the feeding device can comprise both inductive transmitting elements (one or more inductive transmitting elements) and capacitive transmitting elements (one or more transmitting armatures), so as to carry out an inductive and capacitive hybrid transmission of electrical power, wherein these two technologies can be used alternatively or simultaneously to feed the load arranged on the device to be fed.

According to a different aspect of the invention, common to all of the embodiments outlined above, the power circuit of each transmission group can comprise at least one switching circuit adapted for receiving the pilot signal generated by the signal management circuit and for connecting in an intermittent and periodic manner the transmitting apparatus to a voltage generator, with a frequency equal to the frequency of the pilot signal.

Thanks to this solution it is advantageously possible to generate the voltage wave adapted for feeding the load in a relatively simple, rational and very low cost manner.

In the case in which the transmitting apparatus comprises both inductive transmitting elements (one or more inductive transmitting elements) and capacitive transmitting elements (one or more transmitting armatures), the corresponding power circuit could comprise a plurality of the aforementioned switching circuits, each connected to at least one respective transmitting element (capacitive or inductive) but all controlled with the same pilot signal that is generated by the signal management circuit.

In order to obtain high performance and efficiency in the transfer of electrical power, especially in the case in which the system uses a capacitive coupling, it is preferable for the switching circuit to be capable of generating a voltage wave having a very high frequency (for example of the order of MHz, tens of MHz or hundreds of MHz).

A particularly advantageous way of obtaining this result consists of using a switching circuit made according to totally resonant schemes, in which the circuit topology and the pilot system make it possible to almost completely eliminate the dynamic losses in the switches, therefore allowing high switching frequencies and low losses. A category of switching circuits that advantageously achieves these objectives derives from the suitable modification of amplifiers of classes D, E, F or E/F.

Concerning this, an aspect of the present invention foresees that the switching circuit can comprise a pair of electrical switches connected in series between voltage generator and a reference potential (e.g. ground), a central node connected to the transmission apparatus being comprised between said switches.

In this way it is advantageously possible to generate the voltage wave by simply switching the two switches on and off alternately at the frequency of the pilot signal.

Alternatively, the switching circuit could comprise an inductance (called choke) and a switch connected in series between the voltage generator and a reference potential (e.g. ground), a central node electrically connected to the transmission apparatus being comprised between said inductance and said inductor.

Thanks to this solution it is possible to generate the voltage wave using a single switch and thus reducing the costs of the system.

In both cases, the switches can be active switches, for example BJT and IGBT transistors, type N MOSFET, type P MOSFET, CMOS, FET with high performance based on GaN, GaAs, or other switches.

The resonant part of the circuit can effectively consist of inductors and/or capacities, including those already described previously in the circuit that can thus have the dual function of correctly directing the voltage waves and the clock, keeping them independent, and of making the switching circuit resonant, improving efficiency and performance.

According to a different aspect of the invention, the signal management circuit can comprise a high pass filter to filter the clock signal.

In this way, the clock signal coming from the control circuit of the device to be fed can be effectively filtered from possible disturbances that could worsen the quality thereof. In particular, this provision is very important when the clock signal is captured through a transmitting armature of a capacitive coupling system, particularly when such capturing takes place at the same time as the transmission of the electrical power, since the high pass filter is capable of filtering the clock signal purifying it from the disturbances produced by the voltage wave.

According to another aspect of the invention, the signal management circuit can comprise a frequency divider to reduce the frequency of the clock signal. The use of a frequency divider is useful in the case in which the control circuit arranged on the device to be fed is configured to generate very high frequency clock signals, like in the case of the latest generation of computers or mobile telephones, the frequency of which is generally greater than the frequency necessary to effectively drive the power circuit. The advantage of using a particularly high frequency, subsequently reduced by the frequency divider, consists mainly of taking the frequency of the carrier of the clock signal away from the carrier of the power signal, with consequent simplification and miniaturisation of the filtering stage that can very easily eliminate the harmonic content linked to the power wave from the clock signal sent to the frequency divider.

The aforementioned frequency divider can comprise a cascade of logic gates, like for example DQ flip-flop, JK flip-flop, T flip-flop, or other circuits able to be configured as frequency dividers.

As stated earlier, when the system uses a capacitive coupling, the transfer of electrical power can be obtained by driving the power circuit of the first transmitting armature to generate a voltage wave and driving the power circuit of the second transmitting armature to generate a voltage wave having the same frequency but dephased with respect to that which is applied to the first transmitting armature, preferably in counter-phase.

In order to allow this operation, an aspect of the present invention firstly foresees that the control circuit of the device to be fed can be adapted for generating and for applying to the second receiving armature a second clock signal.

In this way, the power circuit that is connected to the second transmitting armature can also be effectively activated to apply to said second armature the relative voltage wave.

Since the voltage wave applied to the second transmitting armature must be dephased, preferably in counter-phase, with respect to the voltage wave applied to the first transmitting armature, a solution could be that the second clock signal has the same frequency but is dephased, for example in counter-phase, with respect to the clock signal that is applied to the first receiving armature.

This solution cannot, however always be used since some frequency dividers, like for example those based on a cascade of DQ flip-flop, return an output signal having the same identical phase, both starting from a predetermined clock signal and from its negative (i.e. from a clock signal of equal frequency but in counter-phase), therefore in both cases the resulting voltage waves would have the same phase, simply delayed by a value equal to a period of the clock with very high frequency.

In order to overcome this drawback, an embodiment of the present invention foresees that the signal management circuit of each transmission group can comprise:
  a module for generating a signal in counter-phase with respect to the clock signal, and
  a control module adapted for selecting as pilot signal the clock signal or the signal in counter-phase.

Thanks to this solution each signal management circuit will always have the clock signal coming from the device to be fed (possibly divided in frequency) and a negative clock signal (i.e. in counter-phase), and can select whether to drive the power circuit with the clock signal or with its negative, depending on whether the corresponding transmitting armature faces the first or the second receiving armature of the device to be fed.

Concerning this, the control module can be connected to a sensor adapted for generating a position signal indicative of the relative position of the device to be fed and be configured to select the pilot signal based on said position signal.

In other words, the control module can be connected to a sensor (for example based on magnetism, hall effect, electric field, light, sound, RFID transmitter, NFC, antenna, or similar), active or passive, which is adapted for interacting with one or more reference elements arranged on the device to be fed, so as to generate a signal that allows the control module to determine the relative position of one or both of the receiving armatures, understanding which receiving armature is actually facing the transmitting armature and consequently selecting whether to drive the power circuit based on the clock signal or on its negative.

Alternatively, the control module could be configured to measure the value of a parameter indicative of a characteristic magnitude of the clock signal, to compare the measured value with a reference value of said parameter and to select the pilot signal according to whether the reference value is higher or lower than the reference value.

Thanks to this solution, by applying to the receiving armatures of the device to be fed two clock signals having a different value to the aforementioned characteristic magnitude, each control module is effectively capable of automatically understanding whether the relative transmitting armature faces the first or second receiving armature, and thus of suitably selecting whether to drive the power circuit based on the clock signal or its negative.

The aforementioned characteristic magnitude can be selected for example in the group consisting of: the duty cycle of the clock signal, the amplitude of the clock signal and the frequency of the clock signal.

These characteristic magnitudes indeed have the advantage of being able to be discriminated even downstream of a frequency divider.

BRIEF DESCRIPTION OF THE DRAWINGS

Further characteristics and advantages of the invention will become clear from reading the following description provided as a non-limiting example, with the help of the figures illustrated in the attached tables.

FIGS. 4, 10, 14, 16, 18 and 26 show the circuit diagram of a transmission group of electrical power according to different embodiments of the present invention.

FIGS. 6 and 7 show the circuit diagrams of two possible switching circuits for the transmission groups.

DETAILED DESCRIPTION

Figure 1:
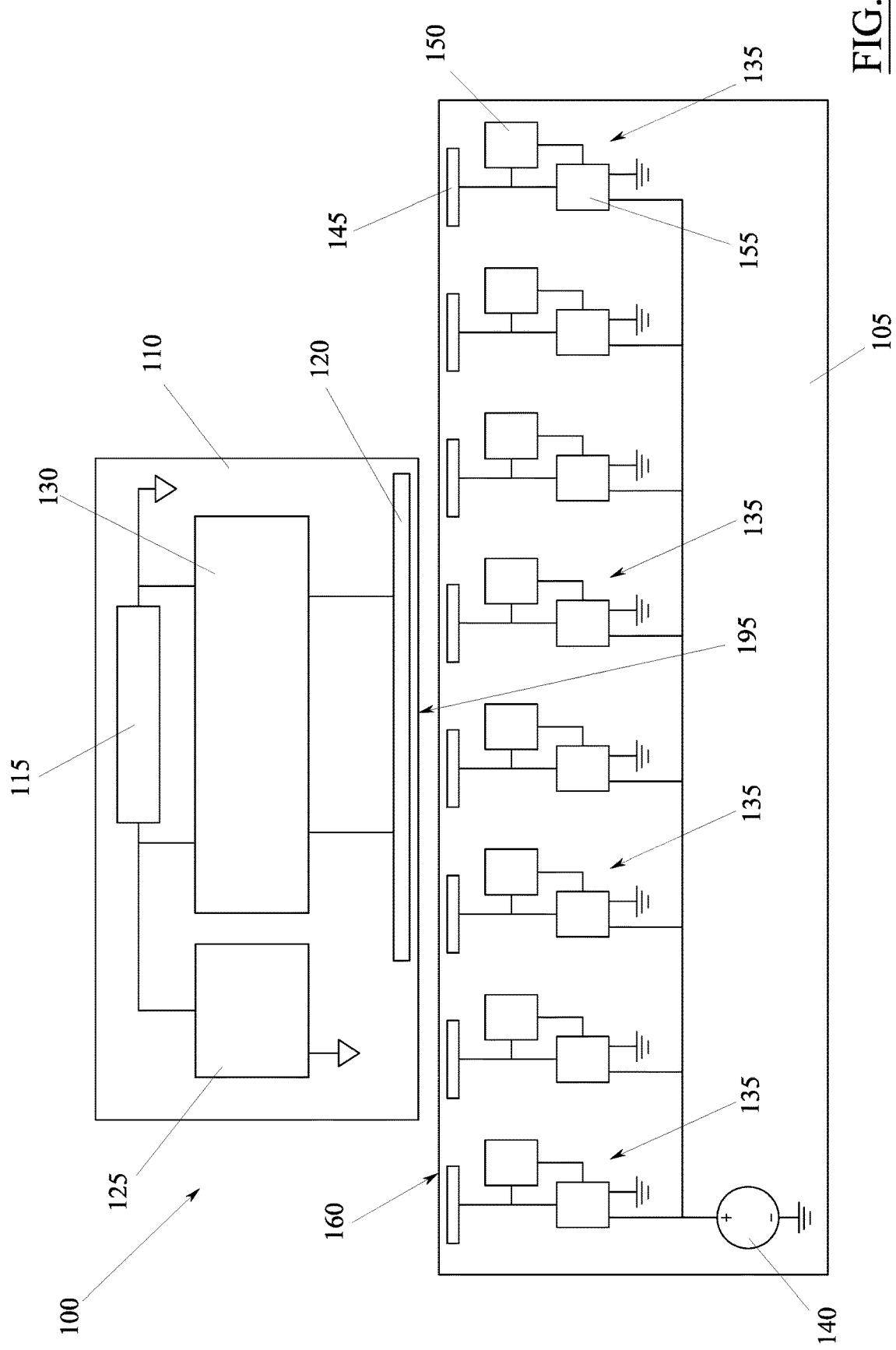
FIG. 1 is a general scheme of a system for transferring electrical power according to the present invention.

With reference to the general scheme of FIG. 1, the system 100 for wirelessly transferring electrical power comprises a feeding device 105 and a device to be fed 110, wherein the device to be fed 110 is physically separate and independent from the feeding device 105. In other words, the device to be fed 110 is any device that can be freely moved in space independently from the feeding device 105, for example it can be taken towards and away from the feeding device 105, without any type of physical constraint between the two devices.

As an example, the device to be fed 110 can be a mobile telephone, a tablet, a computer, a television, a lighting system, for example using LEDs, a home appliance device, a wearable device, an IOT device, a vehicle or any other electrical/electronic device that needs an electrical power supply to be made to operate and/or to possibly to recharge its internal batteries.

The device to be fed 110 schematically comprises at least one electrical load 115 to be fed (for example the batteries), a receiving apparatus 120 of the electrical power connected to the electrical load 115 and a control circuit 125 that can be fed by the electrical load 115, which can read the voltage and/or the current or other electrical measurements applied to the electrical load 115 and that is capable of generating clock signals.

The clock signals generated by the control circuit 125 are typically square wave voltage signals having a predetermined frequency value and duty-cycle. In particular, such clock signals can be high/very high frequency, for example of the order of hundreds of MHz or even GHz.

The device to be fed 110 can possibly also comprise a rectifier 130, which is connected in series between the receiving apparatus 120 and the electrical load 115, so as to be able to transform an alternating voltage applied to the receiving apparatus 120 into a direct voltage useful for feeding the electrical load 115.

The feeding device 105 comprises a plurality of transmission groups 135 of the electrical power, which can be fed by a voltage generator 140.

It should immediately be specified that the voltage generator 140 should hereby be taken to mean any electrical device capable of generating an electrical potential difference (voltage) that remains substantially constant over time. Such a device could therefore be a device adapted for directly generating a constant voltage across it, like for example an electric battery, but it could also be a rectifier adapted for transforming an alternating voltage, for example coming from a normal domestic electrical distribution network, into a direct voltage, or it could be a DC/DC converter adapted for transforming a starting direct voltage into the suitable voltage adapted for feeding the transmission groups 135.

Each transmission group 135 schematically comprises a transmitting apparatus 145 of the electrical power, a signal management circuit 150 and a power circuit 155.

In general, the transmitting apparatus 145 is an apparatus capable of making a non-conductive electrical coupling, for example inductive, capacitive or inductive and capacitive hybrid, with the receiving apparatus 120 of the device to be fed 110.

The signal management circuit 150 is generally a circuit adapted for receiving a clock signal generated by the control circuit 125 of the device to be fed 110 and for generating a pilot signal having a frequency proportional to the frequency of the clock signal received.

The pilot signal can also be a square wave voltage signal having a predetermined frequency value and duty-cycle. The pilot signal can also have a very high frequency, for example of the order of MHz, tens of MHz or hundreds of MHz.

The power circuit 155 is finally a circuit adapted for receiving the pilot signal generated by the signal management circuit 150 and for applying to the transmitting apparatus 145 a voltage wave that is periodically variable over time with a frequency equal to the frequency of the pilot signal and with an amplitude sufficient to provide the electrical power necessary to effectively feed the electrical load 115.

Such a voltage wave is generally obtained by the power circuit 155 by connecting the corresponding transmitting apparatus 145 to the voltage generator 140 in an intermittent and periodic manner, with a frequency equal to the frequency of the pilot signal.

In this way, thanks to the electrical and/or magnetic coupling that is made between the transmitting apparatus 145 and the receiving apparatus 120, the voltage wave is capable of reaching and feeding the electrical load 115, without the need for any conductive electrical connection between the feeding device 105 and the device to be fed 110.

Thanks to the multiple transmission groups 135, this transmission of electrical power can be obtained for different relative positions of the device to be fed 110 with respect to the feeding device 105. In particular, it is possible to arrange the transmitting apparatuses 145 of the different transmission groups 135 according to a matrix distribution, making an active surface 160 in the feeding device 105, on which the device to be fed 110 can be rested in multiple positions and different orientations, in each of which the transmitting apparatuses 145 that are close to the device to be fed 110 will be capable of effectively feeding the electrical load 115, whereas the transmitting apparatuses 145 that are involved in the transmission of electrical power can be kept switched off, reducing the electrical losses and the electromagnetic pollution. Another advantage of this solution consists of the possibility of simultaneously feeding multiple devices 110, which can be variously arranged on the aforementioned active surface 160 of the feeding device 105.

The fact that each transmitting apparatus 145 is connected to its own signal management circuit 150 and to its own power circuit 155, also makes the feeding device 105 resistant to localised damage, which at most can destroy a single transmission group 135, leaving the global system completely operational.

Thanks to this special feature, the feeding device 105 can possibly be made in the form of a mat or sheet that can be cut as desired, so as to give it any shape appropriate for the use. For example, the aforementioned mat or sheet could be cut and applied onto a desk or on a wall, where it can also be perforated to make space for screws or other fixing systems for example of television sets, brackets, frames and lighting devices without compromising the functionality thereof.

As well as the aforementioned advantages, since the driving of each power circuit 155 is always obtained by exploiting the clock signal generated by the control circuit 125 arranged on the device to be fed 110, the feeding device 105 does not need to be equipped with any other generator of the clock signal (e.g. oscillator).

This last characteristic, together with the fact that the device to be fed 110 (e.g. mobile telephone, tablet or computer) is generally already equipped with a control circuit 125 adapted for generating high frequency clock signals for its operation, clearly results in a drastic reduction in the costs necessary for the implementation of the wireless power transmission technology. Indeed, it is not necessary to equip each transmission group 135 with its own generation circuit of the clock, just as it is not necessary to have a complicated communication system used to determine which transmission groups 135 to activate and which to leave switched off. The proposed system, indeed, reduces the costs of each transmission group 135 and at the same time ensures an easy way to activate only the transmission groups 135 arranged close to devices to be fed 110.

Figure 2:
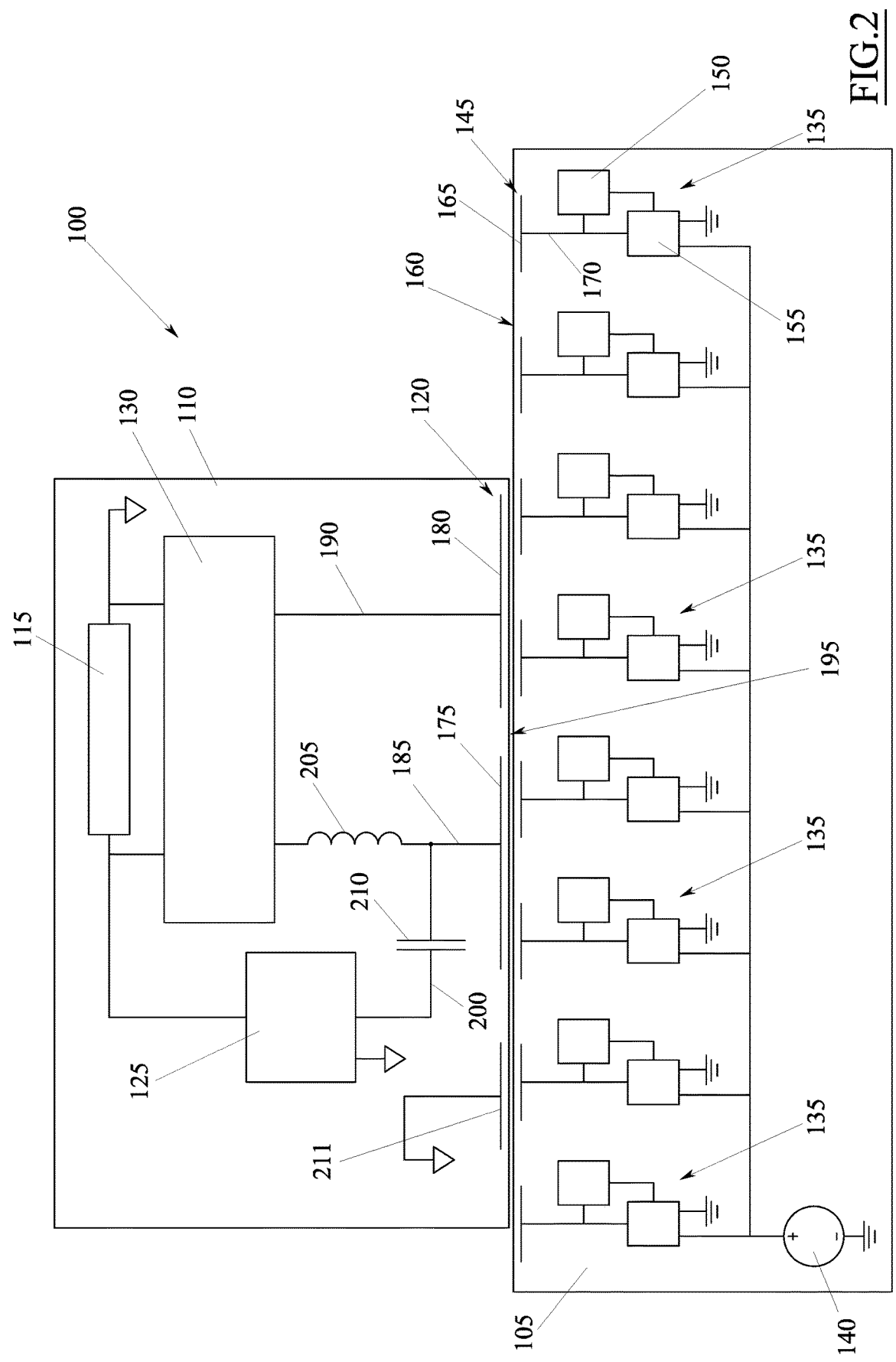
FIGS. 2, 8, 15, 20, 22, 23 and 25 show different embodiments of the system of FIG. 1.

Starting from this general scheme, a first embodiment of the system 100 is illustrated in FIG. 2 and foresees that the transmitting apparatus 145 of each transmission group 135 can comprise at least one transmitting armature 165, which can be connected to the corresponding power circuit 155 by a suitable electrical branch 170.

The transmitting armature 165 can be made for example from a plate, a lamina, a sheet or from any other format of conductive material. The transmitting armature 165 can for example be rectangle or square shaped, without for this reason excluding other shapes, for example triangular, circular, hexagonal or others.

The transmitting armatures 165 of the various transmission groups 135 can be arranged alongside one another, for example coplanar, so as to globally define the aforementioned active surface 160, which can be of any shape and size according to requirements.

In particular, the transmitting armatures 165 can be substantially flush with the active surface 160, possibly covered by a preferably thin layer of dielectric material.

The transmitting armatures 165 can also be reciprocally arranged in space in a more or less regular manner, adjacent to or distant from one another. For example the transmitting armatures 165 can be arranged according to a one-dimensional distribution, i.e. aligned with each other to form a single row, or they can be distributed over many dimensions, for example according to a matrix structure, wherein the transmitting armatures 165 are aligned in rows and columns substantially like the nodes of a matrix, as illustrated for example in FIG. 3.

As already stated, the transmitting armatures 165 can be of various sizes and/or geometric shapes. In particular, the shape and/or size of the transmitting armatures 165 can vary both among different models of the feeding device 105 and within the same model of feeding device 105. The transmitting armatures 165 can be positioned on a rigid or flexible support, soft or hard, planar or non-planar, of any shape, thickness or size. For example, the transmitting armatures 165 can be made by applying conductive laminas on a thick or thin dielectric substrate, or encasing said conductive laminas between two layers of dielectric material, or furthermore modifying the electrical properties of a non-conductive material to become locally conductive.

In order to electrically couple with the transmission groups 135 outlined above, the receiving apparatus 120 of the device to be fed 110 can comprise at least one pair of receiving armatures, including a first receiving armature 175 and a second receiving armature 180.

The receiving armatures 175 and 180 are connected to the electrical load 115 through a respective electrical branch, respectively indicated with 185 and 190, which can be intercepted by the rectifier 130.

The receiving armatures 175 and 180 can also be made as plates, laminas, sheets or other format of conductive material and are generally of much larger dimensions than the transmitting armatures 165. Possibly, each receiving armature 175 and 180 can be made from many small sized plates, suitably connected to one another, for example to minimise problems of electromagnetic pollution. The receiving armatures 175 and 180 can be arranged alongside one another, for example coplanar, so as to globally define in the device to be fed 110 a receiving surface 195 having a shape matching the active surface 160 of the feeding device 105. The receiving armatures 175 and 180 are positioned substantially flush with the receiving surface 195, possibly covered with a dielectric layer of preferably thin thickness. The size and/or shape of the receiving armatures 175 and 180 can be different both for different devices to be fed 110 and within each single device to be fed 110, for example as a function of the size of the device, the geometric constraints present on the device itself and the power necessary for the correct operation of the device itself.

What is important is that the shape, size and arrangement of the receiving armatures 175 and 180 on the device to be fed 110 and the number, shape, size and arrangement of the transmitting armatures 165 on the feeding device 105, are such that, by resting or bringing the receiving surface 195 of the device to be fed 110 towards the active surface 160 of the feeding device 105, the first receiving armature 175 faces the transmitting armature 165 of at least one first transmission group 135, and the second receiving armature 180 faces the transmitting armature 165 of a second transmission group 135, for multiple positions and/or relative orientations of the device to be fed 110 with respect to the feeding device 105, preferably for any position and/or orientation of the device to be fed 110.

In this way, in all of the aforementioned positions and/or orientations of the device to be fed 110, the first and second receiving armature 175 and 180, together with the transmitting armatures 165 facing them, will make at least one pair of electrical capacities that constitute impedances adapted for making a capacitive wireless connection between the feeding device 105 and the device to be fed 110.

In order to allow a transfer of electrical power through this capacitive coupling, the power circuits 155 connected to the transmitting armatures 165 that face the first receiving armature 175 can be driven so as to apply to such armatures a voltage wave having frequency proportional to the clock signal received from the device to be fed 110, whereas the transmitting armatures 165 that face the second receiving armature 180 can be referred to a reference potential (e.g. ground).

In this way, between the first and the second coupling capacity a voltage difference is made that is variable over time capable of feeding the electrical load 115 arranged on the device to be fed 110.

In accordance with this solution, it is thus sufficient for the control circuit 125 of the device to be fed to generate and transmit to the feeding device 105 a single clock signal.

This clock signal can be received by the signal management circuits 150 connected to the transmitting armatures 165 facing the first receiving armature 175 through any non-conductive communication system between the two circuits, for example inductively, possibly using a small independent antenna.

According to a preferred aspect of the system, the control circuit 125 of the device to be fed 110 can, however, apply the clock signal directly to the first receiving armature 175, and each signal management circuit 150 can receive the clock signal directly from the corresponding transmitting armature 165. In particular, the control circuit 125 can apply the clock signal to the electrical branch 185 that connects the first receiving armature 175 to the electrical load 115, for example through an electrical branch 200 flowing together in a connection node comprised between the first receiving armature 175 and the rectifier 130 (if present).

An inductance 205, typically of high value (for example of the order of tens or hundreds of nH), can be connected in series along the electrical branch 185 between the aforementioned connection node of the control circuit 125 and electrical load 115, for example between the connection node and the rectifier 130, which allows the voltage wave coming from the feeding device 105 to reach the electrical load 115 but prevents the passage of the clock signal generated by the control circuit 125 that is thus forced to pass from the device to be fed 110 towards the feeding device 105.

An electrical capacity 210, typically of small value (for example of the order of tens or hundreds of pF), can also be connected in series along the electrical branch 200, between the connection node and the control circuit 125, which allows the clock signal to reach the first receiving armature 175 but prevents the passage of the voltage wave that thus cannot reach the control circuit 125.

On the device to be fed 110 there can finally be a third armature 211 connected to a reference potential (e.g. ground), which is useful for creating a low impedance path between the grounds of the circuits arranged on the device to be fed 110 and the grounds of the circuits arranged on the feeding device 105, at least at the transmission frequencies of the clock signal. As illustrated in greater detail in FIG. 4, the signal management circuit 150 of each transmission group 135 can be adapted for capturing the clock signal from the electrical branch 170 that connects the power circuit 155 to the transmitting armature 165, for example through an electrical branch 215 that branches directly from said electrical branch 170.

An inductance 220 can be positioned along the electrical branch 170 between the power circuit 155 and the node from which the electrical branch 215 branches, which can have a sufficiently high value (for example of the order of tens of nH or hundreds of nH) to prevent the clock signal coming from the control circuit 125 arranged on the device to be fed 110 from being able to interact with the power circuit 155, allowing the voltage wave to pass towards the transmitting armature 165.

In this way, the clock signal generated by the device to be fed 110 can be advantageously captured by the signal management circuit 150 from the transmitting armatures 165 that face the first receiving armature 175 through the same capacitive coupling that also allows the transfer of power, simplifying and rationalising the feeding device 105.

Each of such transmitting armatures 165 can therefore have the voltage wave adapted for transferring power to the electrical load 115 applied to it, whereas all of the other transmitting armatures 165 of the feeding device 105 will remain switched off or referred to a reference potential (e.g. ground).

Concerning this, each transmission group 135 can comprise an activation switch 225 arranged along the electrical branch 170 between the signal management circuit 150 and the transmitting armature 165, which is adapted for selectively connecting the transmitting armature 165 to the corresponding power circuit 155 and to the corresponding signal management circuit 150 or to a reference potential (e.g. ground).

In other words, this activation switch 225 can be selectively switched between a closed configuration, wherein it connects the transmitting armature 165 to an electrical branch 230 referred to ground or to another reference potential, and an open configuration, wherein it connects the transmitting armature 165 to the electrical branch 170 that connects to the relative power circuit 155 and to the relative signal management circuit 150.

An electrical capacity 235 can be positioned on the electrical branch 230, for example to create a ground connection between the data circuits arranged on the feeding device 105 and on the device to be fed 110.

Thanks to this solution, the activation switch 225 can be advantageously used by a control circuit of the feeding device 105 to automatically activate each transmission group 135 at the moment in which the corresponding transmitting armature 165 couples with the first receiving armature 175 of a device to be fed 110.

For example, the activation switch 225 of each transmission group 135 can be kept normally in closed position, so that the transmitting armature 165 is completely insulated both from the power circuit 155 and from the signal management circuit 150. In this configuration, the signal management circuit 150 is not able to receive any clock signal nor possible disturbances that could cause the accidental activation of the power circuit 155, which thus remains completely switched off, reducing the energy consumption and the electromagnetic pollution of the feeding device, and at the same time ensuring a signal connection between the grounds of the transmission circuit 105 and the device to be fed 110.

Starting from this configuration, the activation switch 225 can be periodically brought into open configuration for short instants, for example with the help of a timer or of a suitable counter, connecting the transmitting armature 165 to the power circuit 155 and to the signal management circuit 150. During these brief instants, if the transmitting armature 165 does not face the first receiving armature 175 of the device to be fed 110, the signal management circuit 150 will not in any case receive any clock signal, so that the power circuit 155 will remain switched off and the activation switch 225 can be brought back into closed configuration. Vice-versa, if at the opening of the activation switch 225 the transmitting armature 165 faces the first receiving armature 175 of the device to be fed 110, the signal management circuit 150 will automatically receive the clock signal and will command the power circuit 155 to feed the transmitting armature 165 and consequently the electrical load 115. In this case, the activation switch 225 can be kept in open configuration so long as the signal management circuit 150 continues to receive the clock signal.

At the same time, the activation switches 225 connected to the transmitting armatures 165 that face the second receiving armature 180 of the device to be fed 110, will always remain in closed configuration since the relative signal management circuit 150 never receives any clock signal, keeping the second transmitting armature 165 connected to the reference potential (e.g. ground). According to an embodiment of the system 100, the generation of the clock signal by the control circuit 125 of the device to be fed 110, and therefore its capturing by the signal management circuit 150, can take place during brief steps in which the generation of the voltage wave is temporarily suspended and in which there is therefore no transmission of power. In this case, the clock signal can be used to charge the suitable buffers (not illustrated) which, during the subsequent power transmission step, are capable of generating the pilot signal necessary to drive the power circuit 155.

In other words, it is possible to exploit idle times, tendentially short, during which the power circuit 155 is kept switched off to allow the storage of the clock signal in the buffers, which are subsequently used to generate the pilot signal in the following power transmission step, upon ending which the power circuit 155 is switched off again to regenerate the control signal. The need to regenerate the control signal derives from the precision with which the constancy of the phase of the signals is ensured, since all of the transmitting armatures 165 facing the first receiving armature 175 must transmit power waves in phase with each other to avoid malfunctions or losses of power and/or efficiency.

This provision simplifies the design of the signal management circuits 150, and of possible filtering stages, since there is no interference between the clock signal and the voltage wave. On the other hand, this approach does not allow the simultaneous transmission of data (control data, but also data able to be used by the user for other purposes, for example to share music, videos, files or other among many devices close to the transmission plane) and power, moreover requiring buffers, increasing the latency and reducing the theoretical maximum pass band of the system.

For this reason, a preferred embodiment of the system 100 foresees that the generation and capturing of the clock signal takes place at the same time as the generation and application of the voltage wave.

In this case, the signal management circuit 150 of each transmission group 135 preferably comprises a filter 240 arranged on the electrical branch 215 directly connected with the transmitting armature 165, which is adapted for filtering the clock signal.

In particular, the filter 240 can have a high pass characteristic (for example tens or hundreds of MHz), capable of blocking or greatly attenuating the power wave, on the other hand passing the clock signal coming from the control circuit 125 arranged on the device to be fed 110.

The filter 240 can also have a suitable low-cut or band-cut characteristic to further attenuate the power wave generated by the power circuit.

It should be emphasised that the filter 240 constitutes an essential part of the system 100 if data and power must be transmitted simultaneously through the capacitive coupling. In this case, in order to simplify the filter 240 it may be suitable to distance the frequencies of the clock signal and of the fundamental harmonic of the voltage wave as much as possible.

In some embodiments, the filter 240 can be a filter of a higher order than the first, like for example a Bessel, Chebyshev, Butterworth, Elliptical, inverse Chebyshev filter or other suitable filters aimed at attenuating the contribution of the voltage wave as much as possible in order to obtain a clock signal from the device to be fed 110 that is as clean as possible.

Downstream of the filter 240, the signal management circuit 150 can also comprise a suitable frequency divider 245 adapted for reducing the frequency of the clock signal.

The use of this frequency reducer 245 is particularly useful in the case in which the control circuit 125 arranged on the device to be fed 110 is configured to generate very high frequency clock signals, like in the case of the latest generation of computers or mobile telephones, the frequency of which is generally greater than the frequency necessary to effectively drive the power circuit 155. This also makes it possible to substantially simplify the filter 240, since the frequencies of the power stage and of the clock signal are very far apart, and therefore it is easy with a simple high pass filter (for example a capacity of a few pF) to make only the very high frequency clock signal reach the frequency divider 245.

Figure 5:
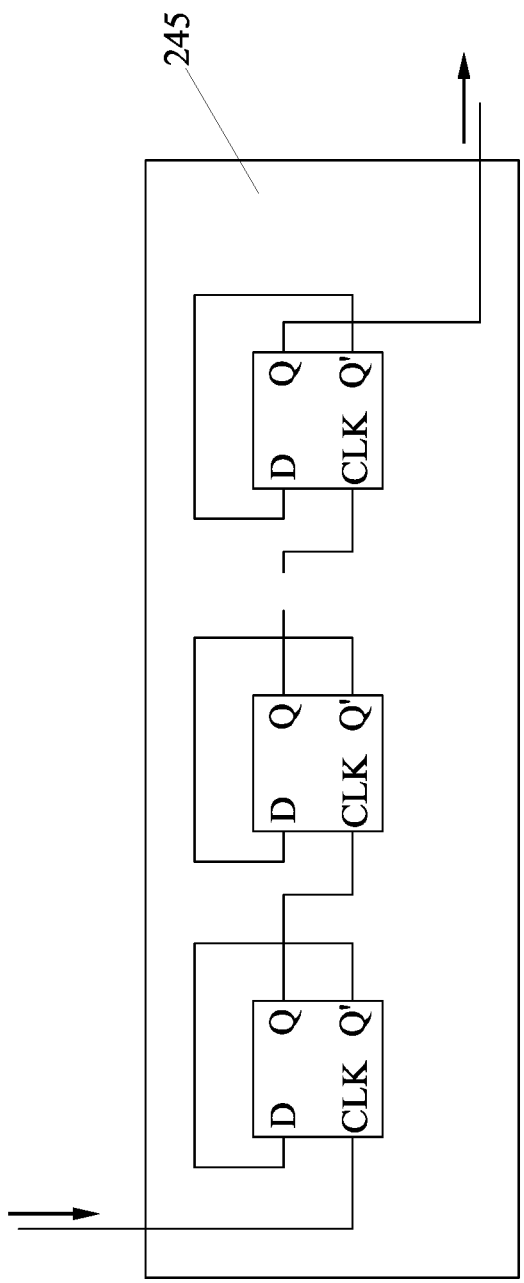
FIGS. 5, 9 and 12 show the circuit diagram of a voltage divider according to as many embodiments of the present invention.

As illustrated in FIG. 5, the frequency divider 245 can comprise a cascade of logic gates, like for example DQ flip-flop, each of which possesses an input for the data (D), two complementary outputs (Q, Q') and a synchronisation input (CLK).

With reference for example to the use of DQ flip-flops, these flip-flops can be connected together so that the "original" clock signal, i.e. the one in output from the filter 240, enters into the synchronisation input of the first DQ flip-flop. The signal Q', negative of the output signal Q, of the first DQ flip-flop is connected to the input gate D of the same DQ flip-flop, whereas the output signal Q is connected to the synchronisation gate CLK of the next DQ flip-flop, and so on.

It should be noted that the first DQ flip-flop of the cascade modifies the duty-cycle of the "original" clock signal, providing in output a new square wave clock signal with duty-cycle equal to 50% regardless of the duty-cycle of the "original" clock signal.

In this way, the output Q of each DQ flip-flop of the cascade is a square wave clock signal having duty-cycle equal to 50% and frequency that is halved with respect to the clock signal received in input.

By suitably selecting the number of DQ flip-flops of the cascade it is therefore possible to divide the frequency of the "original" clock signal in order to obtain, in output from the frequency divider 245, a clock signal that can be effectively used as pilot signal of the power circuit 155.

However, this does not rule out the possibility that in other embodiments the frequency divider 245 can be based on JK flip-flop, T flip-flop, or other circuits able to be configured as frequency dividers. As far as the power circuit 155 of each transmission group 135 is concerned, this circuit can comprise at least one switching circuit 250 (see FIGS. 6 and 7) adapted for receiving the pilot signal generated by the corresponding signal management circuit 150, in this case the signal in output from the frequency divider 245, and for intermittently and periodically connecting the corresponding transmitting armature 165 to the voltage generator 140, with a frequency equal to the frequency of the pilot signal.

In order to obtain high performance and efficiency in the transfer of electrical power, it is preferable for the switching circuit 250 to be capable of generating a voltage wave having a very high frequency (for example of the order of MHz, tens of MHz or hundreds of MHz) and an amplitude sufficient to feed the electrical load 115.

A particularly advantageous way of obtaining this result consists of using a switching circuit 250 made according to soft switching, quasi-resonant or totally resonant schemes, in which the circuit topology and the drive system make it possible to almost completely eliminate the dynamic losses in the switches, therefore allowing high switching frequencies 250 and low losses. A category of switching circuits 250 that advantageously achieves these objectives derives from the suitable modification of amplifiers of class D, E, F or E/F.

As an example, the switching circuit 250 can comprise a pair of switches 255 and 260 connected in series between voltage generator 140 and a reference potential (e.g. ground), as illustrated in the scheme of FIG. 6.

In particular, the first switch 255 is connected to the voltage generator 140 whereas the second switch 260 is connected to the reference potential (obviously different from that of the voltage generator 140), for example to the ground potential.

Between the first and the second switch 255 and 260 there is a central node 265, which is connected to the corresponding transmitting armature 165 through the electrical branch 170.

This pair of switches 255 and 260 essentially constitutes a bridge means H used for generating the high frequency voltage wave that feeds the transmitting armature 165.

The pair of switches 255 and 260 can for example be a pair of BJT or IGBT transistors, type N MOSFET, type P MOSFET, CMOS pair, high performance FET based on GaN, GaAs, or other switch.

In this way it is advantageously possible to generate the voltage wave by simply switching the two switches 255 and 260 on and off alternately at the frequency of the pilot signal.

In order to drive the two switches (for example MOSFET) it may be necessary to have a suitable driver 270 that, receiving the pilot signal in output from the signal management circuit 150, converts such a signal into suitable waves (typically amplified in voltage and/or current) adequate for switching the two typically high frequency switches on and off alternately.

If the system, comprising the reactive elements distributed in the circuit such as the inductance 220, the capacity consisting of the armatures 165 brought close to the armatures 175, the inductance 205 and possible other reactive elements inserted in the system for a suitable tuning of the circuit, is tuned so that the total system constitutes a series or parallel LC resonator, then the overall circuit can be like a resonant circuit of the Zero Voltage Switch (ZVS) or Zero Current Switch (ZCS) type, substantially limiting the losses and allowing substantial increases in the operating frequency, therefore ensuring low cost and low bulk of the circuit and high power density transmitted.

Such an objective can be pursued with suitable matching network both on the transmission electrical branch 170, possibly with the addition of further reactive elements.

This type of switching circuit 250 is however penalised by the presence of two switches 255 and 260, typically operating at high frequency. Of these switches, the switch 255 is the most critical, since it typically refers to a floating node and thus needs a bootstrap circuit that is not very functional and expensive at high frequencies. Alternatively, the first switch 255 can for example consist of a P-MOS, but in this case the performance is typically lower and the area occupied by the P-MOS is greater than an N-MOS of analogous performance.

In order to avoid this drawback and to further simplify the system 100 (see FIG. 7), the switching circuit 250 can comprise an inductance 275 (called choke) and a switch 280 connected in series between the voltage generator 140 and the reference potential (e.g. ground), wherein the inductance is directly connected to the voltage generator 140 whereas the switch 280 is connected to the reference potential.

In practice, the inductance 275 replaces the first switch 255 of the previous embodiment.

Also in this case, the switch 280 can for example be a BJT or IGBT transistor, type N MOSFET, type P MOSFET, CMOS, high performance FET based on GaN, GaAs, or another switch.

A central node 285, which is connected to the transmitting armature 165 through the electrical branch 170 on which the inductance 220 can be present is comprised between said inductance 275 and the inductor 280.

In parallel to the switch 280 a capacity 290 of suitable value can be further introduced, which can also consist entirely or in part of the parasite capacity of the switch 280.

In this way, it is advantageously possible to generate the voltage wave by simply switching the single switch 280 on and off at the frequency of the pilot signal.

In order to drive the switch it may be necessary to have a suitable driver 295 that, receiving the pilot signal in output from the signal management circuit 150, converts such a signal into a suitable wave suitable for switching the switch 280 on any off at high frequency.

This second implementation of the switching circuit 250, if suitably tuned, can constitute a ZVS or ZCS circuit that is particularly efficient, thus characterised by extremely limited losses and easy to drive even at very high frequencies. It should be emphasised how both of the switching circuits proposed above distinguish themselves from the classical amplifier for example in class D (possibly resonant) or class E or F, since in this implementation multiple switching circuits 250 are present in parallel, each connected to a corresponding transmitting armature 165, possibly through an inductance 220. Therefore, the analytic modelling and the sizing of the circuit proposed differ substantially from the known schemes, whilst still globally reproducing the positive effects (and in particular the low losses and the high frequencies typical of resonant schemes).

The proposed implementations have substantial advantages with respect to the state of the art and in particular they are particularly efficient since they exploit the architectures that, whilst being distinguished from the known amplifiers in class E or F or other known ZVS or ZCS resonant circuits, in any case allows transitions from switched on to off and vice-versa of the switches substantially without losses or with extremely limited losses.

The presence of multiple switching circuits 250 in parallel constitutes a further advantage since the output power is divided between multiple switches, for example type N MOSFET, each of which therefore manages only a fraction of the total power, therefore being able to be of smaller size and thus for example easier to integrate in an integrated circuit, and easier to take to high operating frequencies, useful for maximising the power transmitted by the wireless system proposed, at the same time miniaturising the reactive elements.

When the system uses a capacitive coupling, the transfer of electrical power towards the electrical load 115 can also be obtained, in an alternative manner with respect to what was described earlier, for example by applying to the transmitting armatures 165 that face the first receiving armature 175 a predetermined voltage wave, and at the same time applying to the transmitting armatures that face the second receiving armature 180 a voltage wave having the same frequency but dephased with respect to the other, preferably in counter-phase.

In order to obtain this operation, the system 100 described earlier can be modified as indicated hereinafter, keeping all of the other characteristics substantially unchanged.

Figure 8:
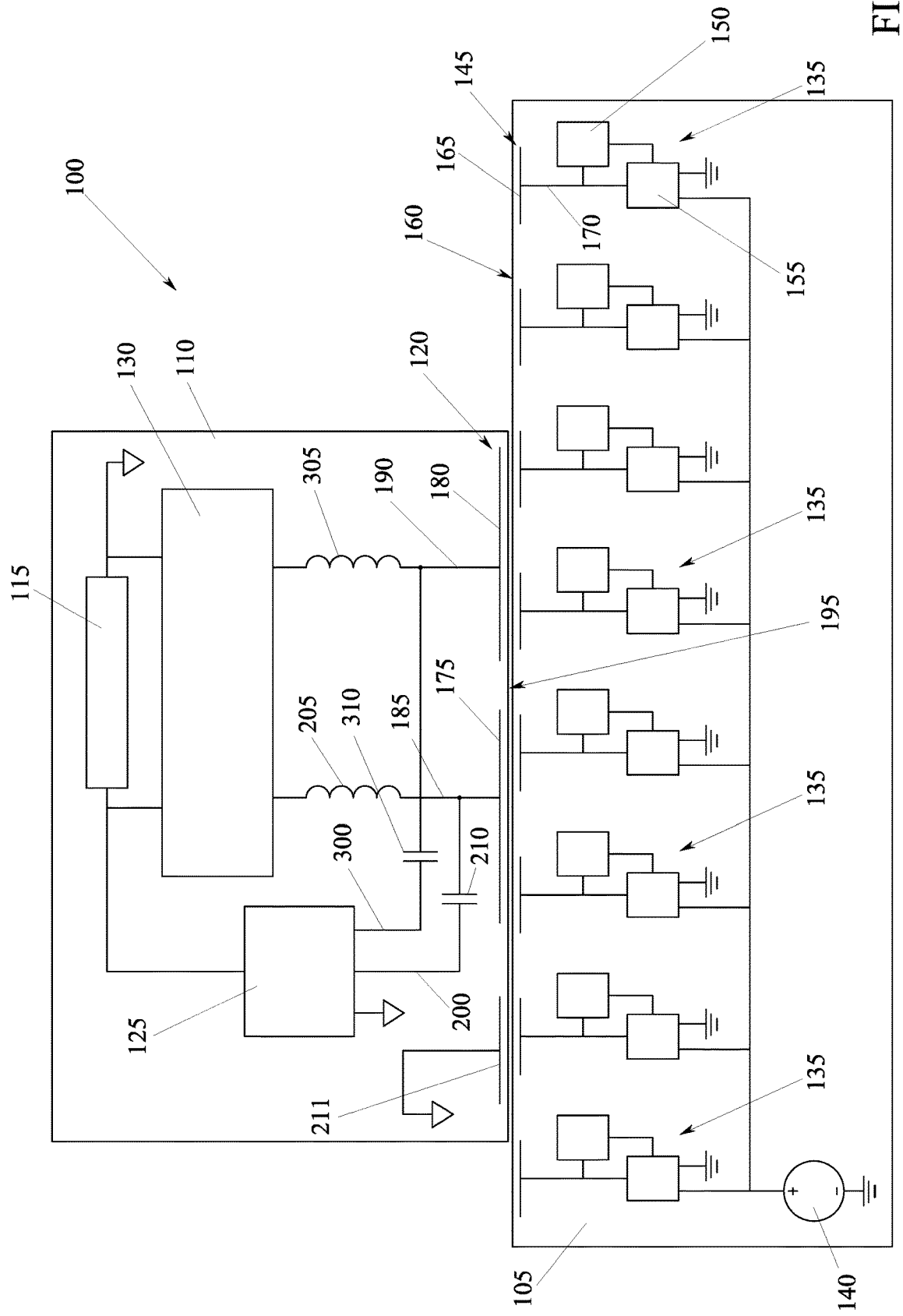

In particular, as illustrated in the circuit diagram of FIG. 8, it is foreseen for the control circuit 125 of the device to be fed 110 to be able to be adapted for generating and for applying to the second receiving armature 180 a second clock signal.

For example, the control circuit 125 can apply the second clock signal to the electrical branch 190 that connects the second receiving armature 180 to the electrical load 115, for example through an electrical branch 300 flowing together in a connection node comprised between the second receiving armature 180 and the rectifier 130, in a substantially analogous manner to what is foreseen for the first receiving armature 175.

In particular, a further inductance 305, typically of high value (for example of the order of tens or hundreds of nH), can be connected in series along the electrical branch 190 between the aforementioned connection node of the control circuit 125 and electrical load 115, for example between the connection node and the rectifier 130, which allows the voltage wave coming from the feeding device 105 to reach the electrical load 115 but prevents the passage of the second clock signal generated by the control circuit 125, which is thus forced to pass from the device to be fed 110 towards the feeding device 105.

The inductances 205 and 305 also have the purpose of constituting a resonator with the receiving capacities, therefore allowing a greater transfer of power to the electrical load 115, as well as a matching of the impedances useful for example for making ZVS or ZCS type converters (which thus minimise the losses and can operate at extremely high frequencies).

The inductances 205 and 305 also have the further purpose of substantially increasing the impedance of the electrical load 115, normally limited, seen from the control circuit 125, which in this way can operate at high frequency since it substantially does not interact with the load.

An electrical capacity 310, typically of small value (for example of the order of tens or hundreds of pF), can in turn be connected in series along the electrical branch 300, between the connection node and the control circuit 125, which allows the clock signal to reach the second receiving armature 180 but prevents the passage of the voltage wave, which thus cannot reach the control circuit 125.

This system operates increasingly well as the difference in frequency between the voltage wave that feeds the electrical load 115 and the carrier of the signals injected by the control circuit 125 increases.

When the second receiving armature 180 faces one or more transmitting armatures 165, the second clock signal is captured by the corresponding signal management circuits 150 and used to suitably drive the corresponding power circuits 155 so as to apply to said transmitting armatures 165 a voltage wave of equal frequency but dephased, preferably in counter-phase, with respect to that applied to the transmitting armatures 165 facing the first receiving armature 175.

This effect can theoretically be obtained by configuring the control circuit 125 of the device to be fed 110 so that it generates and applies to the second receiving armature 180 a second clock signal having the same frequency but shifted, preferably in counter-phase, with respect to the clock signal that is applied to the first receiving armature 175.

This solution cannot, however, always be used since some frequency dividers 245, like for example those based on a cascade of DQ flip-flops, return an output signal having the same identical phase, both from a predetermined clock signal and from its negative (i.e. from a clock signal of equal frequency but in counter-phase), therefore in both cases the resulting voltage waves would have the same phase, simply delayed by one cycle of the very high frequency wave.

Figure 9:
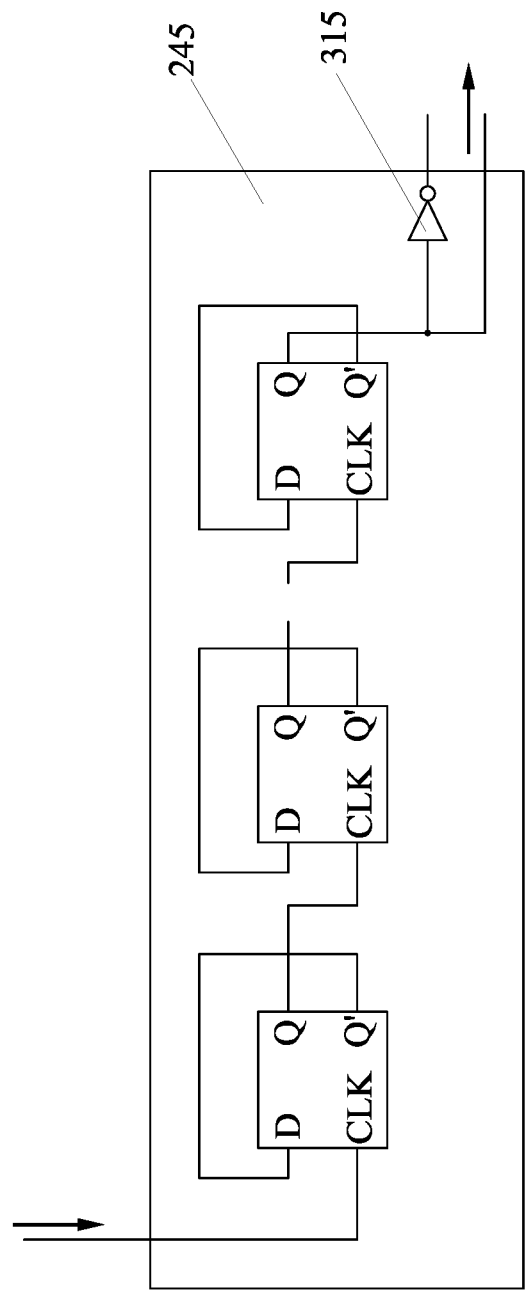

In order to overcome this drawback, the signal management circuit 150 of each transmission group 135 can be modified so that the output signal of the frequency divider 245 is applied on two independent channels as illustrated in FIG. 9, one of which is connected to a module 315 adapted for negating the clock signal coming out from the frequency divider 245, obtaining a clock signal that is equal but in counter-phase. The module 315 can for example comprise a simple NOT logic gate adapted for negating the signal received in input.

In this way, the frequency divider 245 will always provide two potential pilot signals, one of which is a "direct" pilot signal, obtained by simply reducing the frequency of the original clock signal, and one is a pilot signal "in counter-phase", obtained by reducing the frequency of the original clock signal and inverting the phase thereof.

Figure 10:
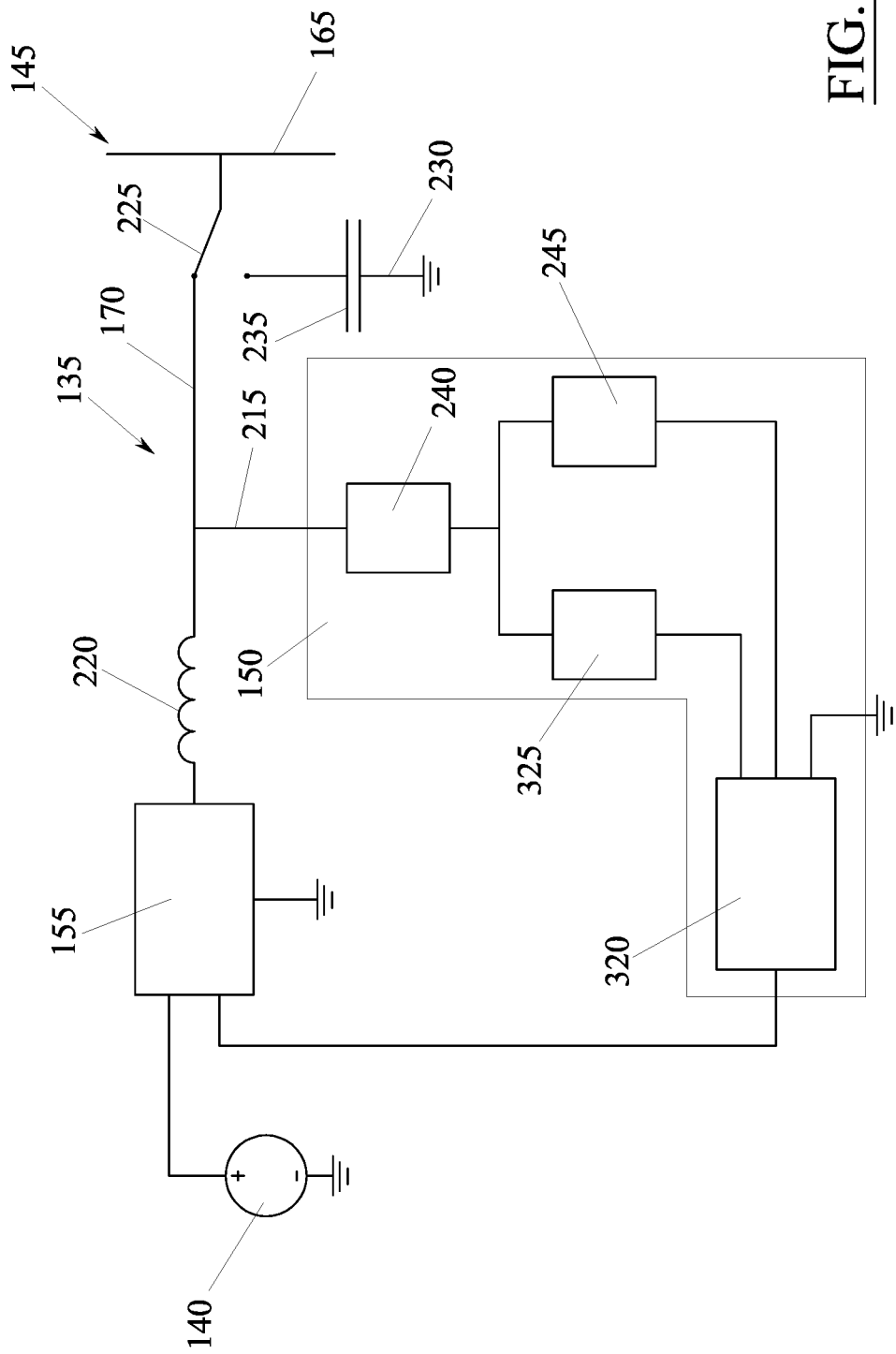

As illustrated in FIG. 10, the signal management circuit 150 of each transmission group 135 can in this case further comprise a selector 320, which is connected with the frequency divider 245 and is adapted for sending to the power circuit 155 selectively the "direct" pilot signal or the pilot signal "in counter-phase", depending on whether the corresponding transmitting armature 165 faces the first receiving armature 175 or the second receiving armature 180, respectively.

In order to understand whether the transmitting armature 165 faces the first receiving armature 175 or the second receiving armature 180, the selector 320 can be commanded by a suitable control module 325, which can implement different strategies.

A first strategy foresees that the control circuit 125 of the device to be fed 110 applies to the first receiving armature 175 and to the second receiving armature 180 two square wave clock signals having significantly different duty-cycle (for example respectively equal to 20% and 80%). For example, the first value of the duty-cycle (for example 20%) can be associated with the "first receiving armature 175" information, whereas the second value of the duty-cycle (for example 80%) can be associated with the "second receiving armature 180" information.

Figure 11:
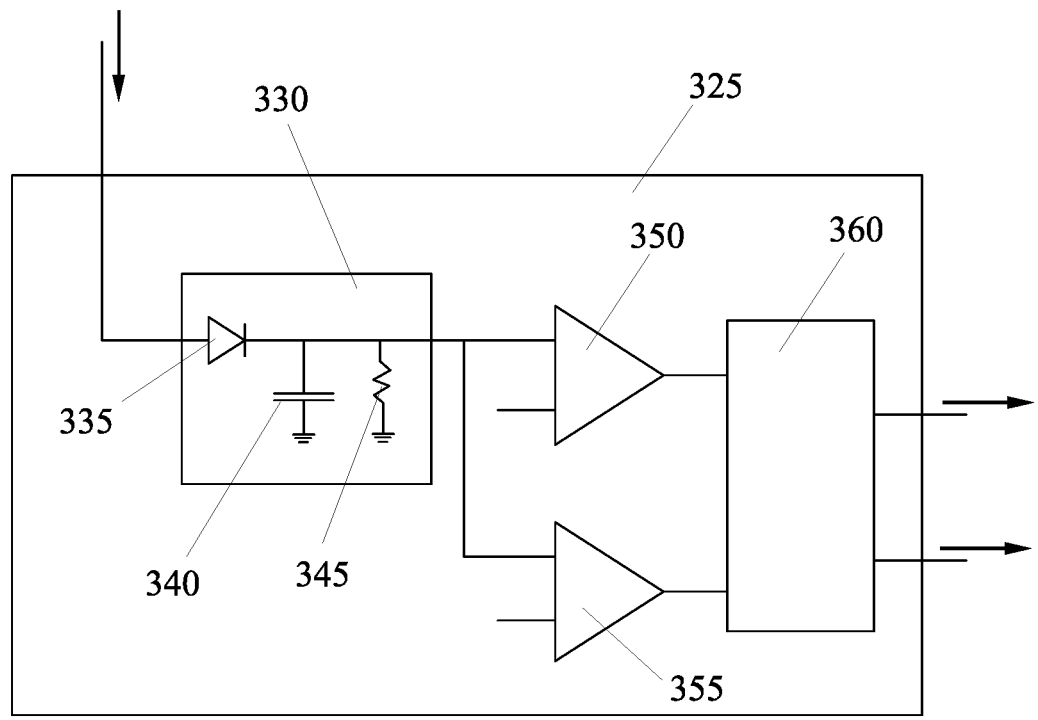
FIGS. 11 and 13 show the scheme of a control module according to two different embodiments of the invention.

By exploiting this information, the control module 325 can be effectively and simply made as a detector circuit of the effective value of the voltage of the clock signal, for example measuring or detecting the Root Mean Square RMS of such a signal, as illustrated in the scheme given in FIG. 11.

In particular, the control module 325 can comprise a first stage 330 adapted for receiving the clock signal in output from the filter 240, for example upstream of the frequency divider 245, and for detecting the RMS value thereof. For example, such a first stage 330 can be made by connecting the output of the filter 240 to the anode of a diode 335 sufficiently quickly. The cathode of the diode 335 can, on the other hand, be connected to an end of a condenser 340, the other end of which is connected to a reference voltage, for example ground. In parallel to the condenser 340, the first stage 330 can also comprise a resistance 345 useful for discharging the condenser 340 itself once the input signal has stopped.

The output of this first stage 330 is therefore a voltage signal proportional to the RMS value of the input signal, which changes as a function of the duty-cycle and therefore of the "first receiving armature 175" or "second receiving armature 180" information, allowing the suitable pilot phase of the transmitting armature 165 to be selected.

The control module 325 can therefore comprise a comparator 350 that receives the signal in output from the first stage 330 and compares its RMS voltage value with a reference voltage. If the RMS voltage in output from the first stage 330 is less than the reference value, this means that the duty-cycle of the clock signal was low (for example 20%), or vice-versa that the duty-cycle of the clock signal was high (for example 80%). Indeed, it is clear that as the duty-cycle of the clock signal increases, the RMS value thereof increases, until the threshold imposed by the first reference voltage is exceeded.

The output signal from the first stage 330 can also be applied to a second comparator 355 that compares the RMS voltage value with a second reference voltage, typically close to the ground voltage. If the RMS voltage in output from the first stage 330 is less than the second reference value, this means that the transmitting armature 165 is not receiving any clock signal and thus that no receiving armature 175 or 180 of the device to be fed 110 is close.

The output of the first comparator 350 and of the second comparator 355 can also be sent to an extremely simple logic module 360, typically but not necessarily with combinatory logic, which is capable of generating the pilot signals of the selector 320.

In this way, if the RMS signal is greater than the first reference value, the selector 320 will be commanded to drive the power circuit 155 with the "direct" pilot signal; if the RMS signal is comprised between the first and the second reference value, the selector 320 will be commanded to drive the power circuit 155 with the clock signal in counter-phase; if, finally, the RMS signal is less than the second reference value, the selector 320 will not drive the power circuit 155 and the logic will also take care of taking the activation switch 225 into open configuration, so as to connect the transmitting armature 165 to the electrical branch 230 and thus to the reference potential (e.g. ground). A second strategy for understanding whether the transmitting armature 165 faces the first receiving armature 175 or the second receiving armature 180 can foresee that the control circuit 125 of the device to be fed 110 is configured to apply to the first receiving armature 175 and to the second receiving armature 180 two clock signals having the same duty-cycle but different amplitude.

In this case, the architecture of the signal management circuit 150 of each transmission group 135 can be exactly equal to that described earlier and illustrated in FIGS. 10 and 11, since the amplitude of the signal also has a direct impact on the effective value of the voltage of the signal and thus on its RMS.

A third strategy for understanding whether the transmitting armature 165 faces the first receiving armature 175 or the second receiving armature 180 can foresee that the control circuit 125 of the device to be fed 110 is configured to apply to the first receiving armature 175 and to the second receiving armature 180 two clock signals having a different frequency.

Preferably (even if not necessarily), the frequency of the clock signal applied to the second receiving armature 180 must be equal to double the frequency of the clock signal applied to the first receiving armature 175, or vice-versa. The use of the frequency to transmit the indication of which receiving armature 175 or 180 is close to the transmitting armature 165 ensures better immunity from disturbances with respect to systems based on voltage controlled signals (modulation of duty-cycle or of amplitude), but the signal management circuit 150 of each transmission group 135 must be different.

Figure 12:
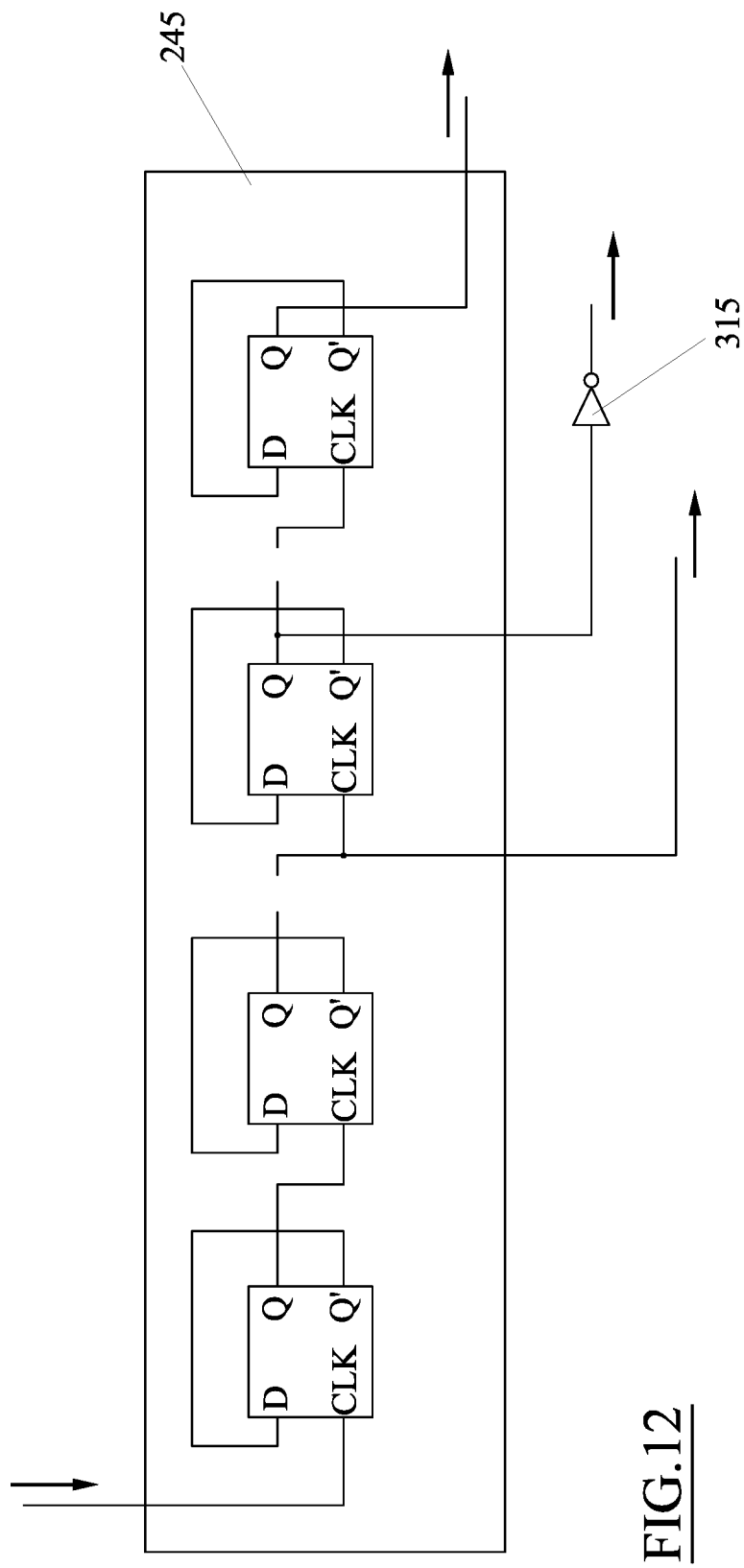

Firstly, the frequency divider 245 must be configured to provide the "direct" pilot signal and the pilot signal "in counter-phase" to be sent to the selector 320, taking them from two different stages as illustrated in FIG. 12. For example, considering the case in which the frequency of the clock signal applied to the second receiving armature 180 is double that of the clock signal applied to the first receiving armature 175, the "direct" pilot signal must be taken from the last stage of the frequency divider 245 whereas the pilot signal "in counter-phase" must be obtained by "negating", for example with the NOT logic gate 315, the signal coming out from the penultimate stage of the frequency divider. In this way, both the "direct" pilot signal and the one "in counter-phase" will have the same frequency and can be used to drive the power circuit 155. Of course, the connection would be the opposite if the frequency of the clock signal applied to the second receiving armature 180 is half that of the clock signal applied to the first receiving armature 175.

Figure 13:
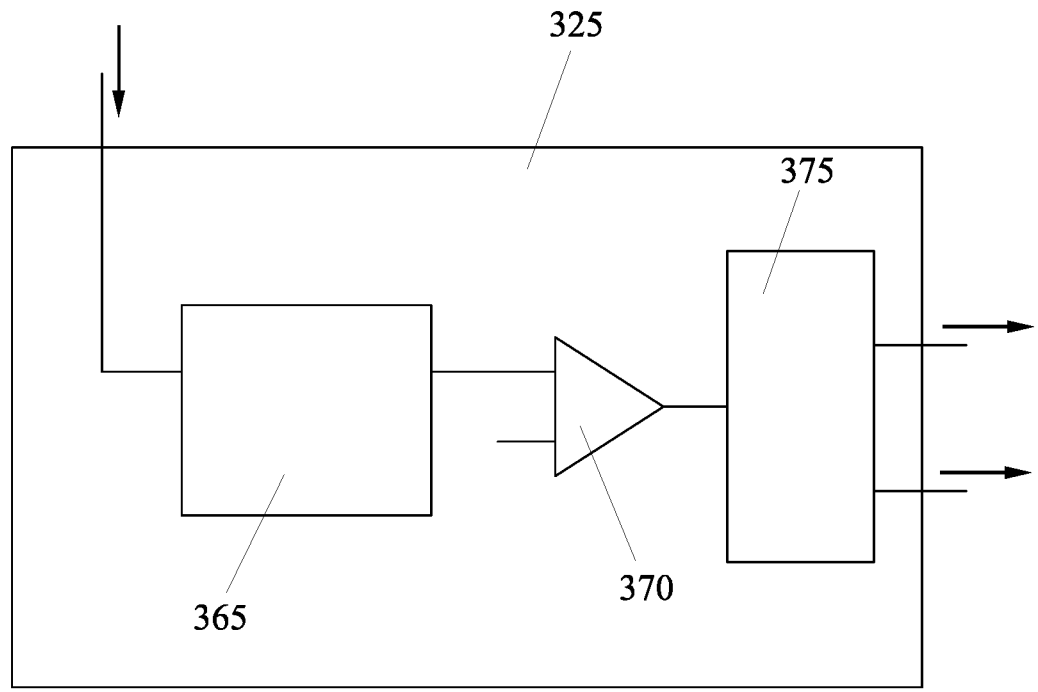

At the same time, the control module 325 of the selector 320 can be modified as illustrated in FIG. 13 and can comprise an integrator circuit 365 (for example a simple RC filter, or any active or passive integrator circuit), which receives in input the clock signal coming from the transmitting armature 165.

Since the wave in input is typically a square wave, its integrated signal in output from the integrator circuit 365 is a triangular wave, which will have an increasingly great peak value the smaller the frequency of the wave in input. In accordance with the previous example, if the clock signal captured is the low frequency one associated with the first receiving armature 175, the integrated signal will therefore have a greater peak value with respect to what there would be if the clock signal captured was the high frequency one associated with the first receiving armature 175. Of course, the correspondence would be opposite if the frequency of the clock signal applied to the second receiving armature 180 was half that of the clock signal applied to the first receiving armature 175.

By exploiting this property, the signal in output from the integrator circuit 365 can therefore be applied in input to a comparator 370 that compares the peak voltage thereof with a reference voltage. The output of the comparator 370 is then processed by a logic module 375, for example detecting for the higher frequency wave no impulse in output from the comparator 370 and a series of equidistant impulses for the lower frequency wave. The logic module 375, typically but not necessarily with combinatory logic, generates the signals to drive the selector 320.

For example, if the peak value of the integrated signal is greater than the reference value, the selector 320 will be commanded to drive the power circuit 155 with the "direct" pilot signal, i.e. having the same phase as that generated by the control circuit 125 arranged on the device to be fed 110, but if on the other hand the peak value of the integrated signal is less than the reference value, the selector 320 will be commanded to drive the power circuit 155 with the pilot signal "in counter-phase". Of course, the operation could also take place in the opposite way.

Finally, if the peak value of the integrated signal is substantially zero (absence of clock signal), the selector 320 will not drive the power circuit 155 and the logic 375 will also take care of taking the activation switch 225 into open configuration, so as to connect the transmitting armature 165 to the electrical branch 230 and thus to the reference potential (e.g. ground), with analogous ways as the previous circuits.

It should be highlighted here that the integrator circuit 365 of the control module 325 can be configured to receive the clock signal directly from the output of the filter 240 or, more advantageously, from the output of a suitable stage of the frequency divider 245, without this conceptually modifying the system.

The proposed system also operates using the divided signal since the information is given by the difference in frequency between the signal indicating one receiving armature or another, not by values of duty-cycle or of amplitude that would be lost by the frequency division stages.

The advantage linked to the use of the signal that enters into the integrator circuit 365 with frequency already divided essentially consists of being able to then use slower comparators 370 with respect to those necessary to process the original signal, and therefore more cost-effective. The greater the division of frequency undergone by the signal before entering into the integrator circuit 365, the lower the required speed of the comparator 370 used to compare the triangular wave with the reference voltage, significantly reducing the cost thereof. Precisely to further reduce the cost of the control circuit, it is also possible to foresee further division stages after the outputs that go to the selector 320. A further advantage is linked to the greater quality of the signal in output from a frequency division stage with respect to that in output from the filter.

Figure 14:
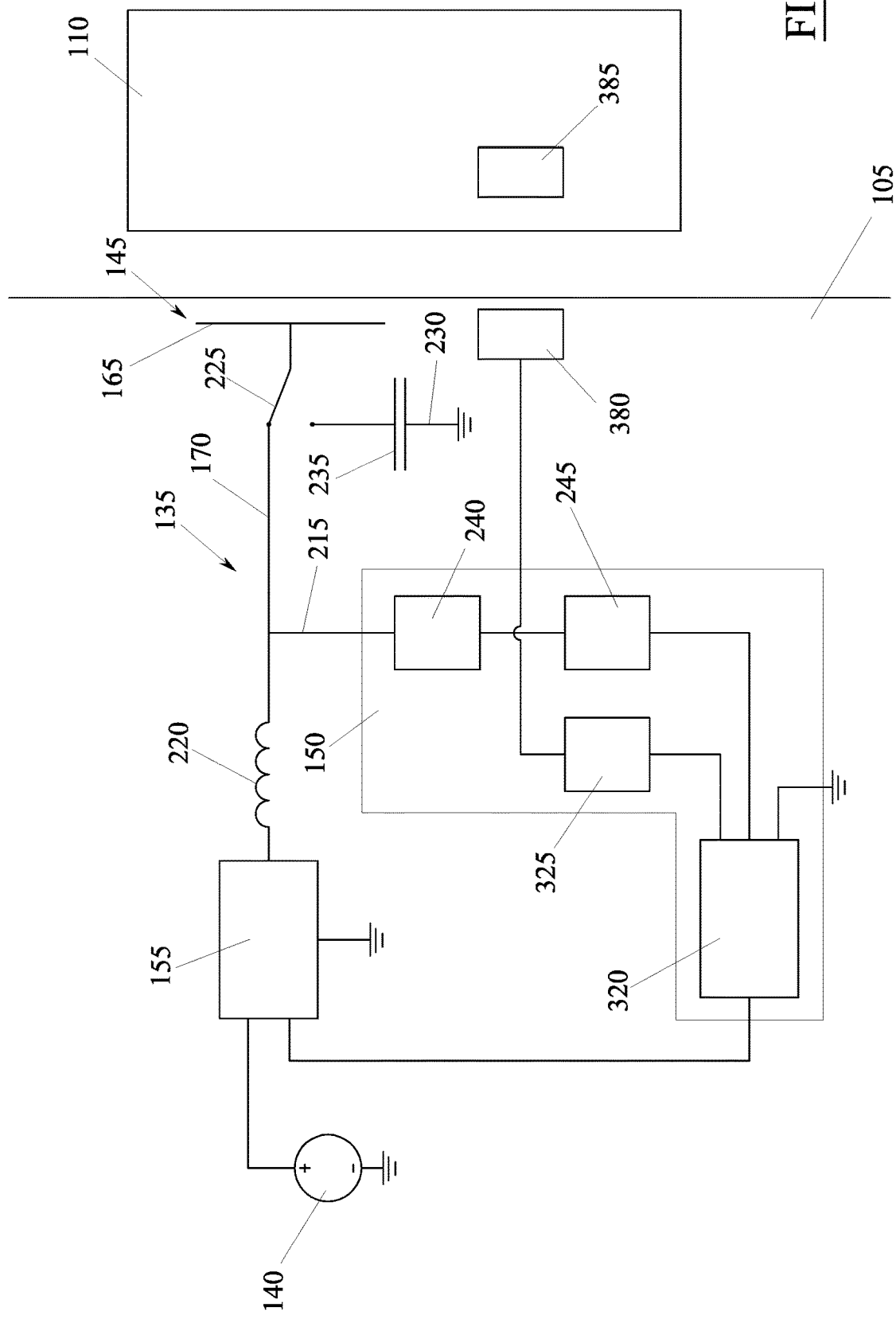

A fourth strategy for understanding whether the transmitting armature 165 faces the first receiving armature 175 or the second receiving armature 180 is illustrated in FIG. 14 and consists of equipping each transmission group 135 with an independent sensor 380 (for example based on magnetism, hall effect, electric field, light, sound, RFID transmitter, NFC, antenna, or similar), active or passive, which is adapted for interacting with one or more reference elements 385 arranged on the device to be fed 110, so as to generate a position signal indicative of the relative position of one or both of the receiving armatures 175 and 180. Each transmission group 135 can also comprise a logic module 390 adapted for receiving the position signal generated by the sensor 380, so as to understand whether the corresponding transmitting armature 165 is close to the first receiving armature 175, to the second receiving armature 180 or to neither, to then command the selector 320 as a consequence.

In this case, it is clear that the principle at the basis of the selection of the "direct" pilot signal or that "in counter-phase" is independent with respect to the clock signal transmitted by the control circuit 125. The latter signal in this case is therefore only used to transmit a clock, and possibly to transfer user data independently.

The schemes proposed above, which makes it possible to apply to the transmitting armatures 165 dephased voltage waves (typically in counter-phase) depending on whether they face the first or second receiving armature 175 and 180, have the advantage of making the transmission of power more effective and of obtaining numerous advantages in terms of efficiency. If for example the power circuits 155 use the scheme of FIG. 7, there is the possibility of substantially reducing the dimensions of the choke inductance 275 of each switching circuit 250 with respect to what is stated in the literature with respect to the sizing of resonant amplifiers for example in class E or F.

If, indeed, normally the choke inductance must be of a particularly high value to ideally constitute a current generator, in the switching circuit 250 proposed it is possible to substantially undersize the choke inductance 275, even allowing inversions of the current sign.

Indeed, globally, the overall circuit constitutes a push-pull system, such that each inversion of current in a feeding branch of a device to be fed 110 corresponds to an analogous but inverse inversion of current in the mirroring branch (for example driving a plate facing the second receiving armature).

In this way, the voltage generator 140 that feeds the transmission circuit overall sees a circuit having a substantially resistive behaviour, thus with optimised power factor without the need for correction stages of the power factor. This constitutes a particularly substantial advantage, not automatic in the presence of switching circuits, in particular if the required miniaturisation is such as not to allow the use of filter capacities in input of large value and large bulks.

Figure 15:
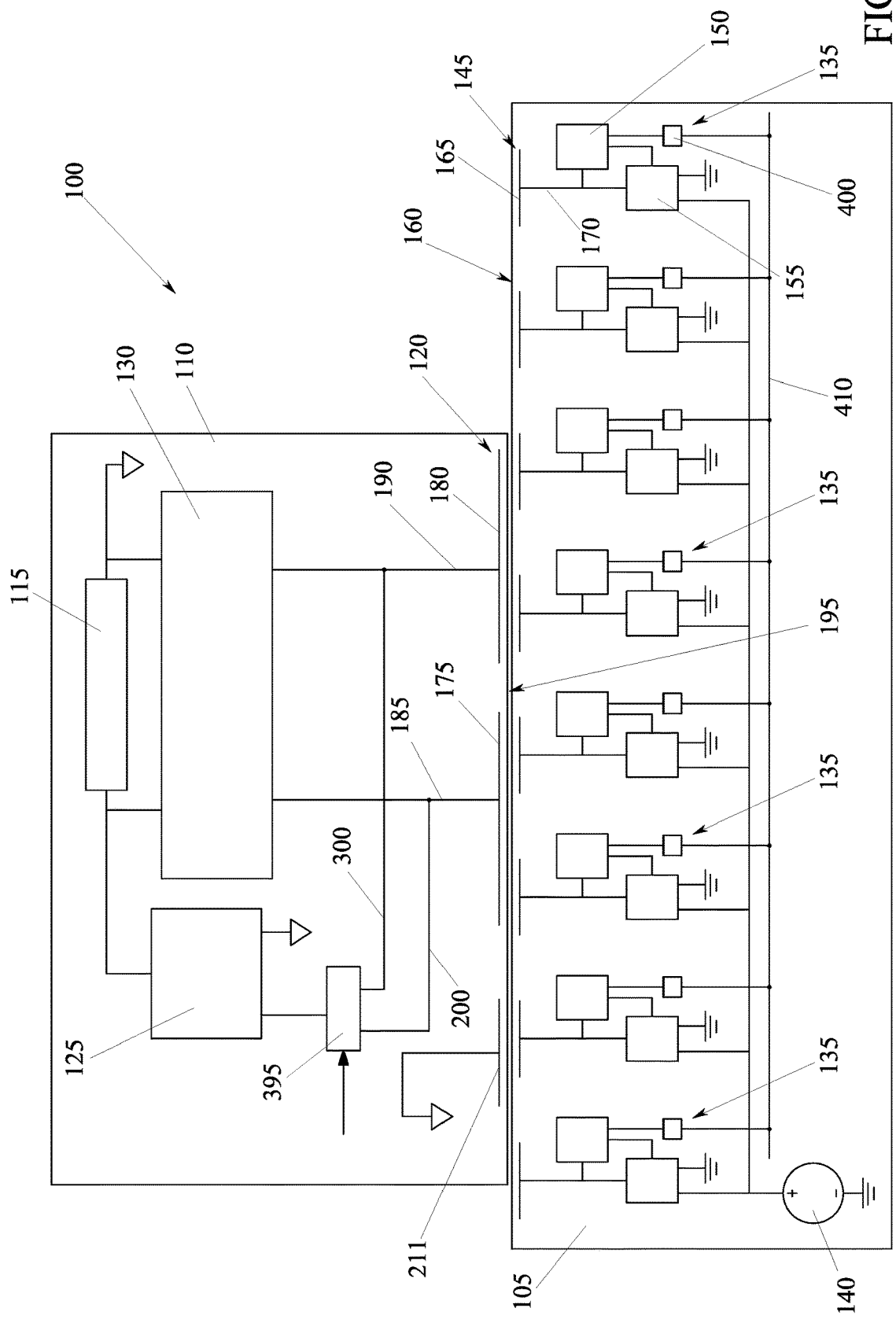

As illustrated in FIG. 15, the feeding device 105 can be modified to also constitute a high speed communication channel between many devices to be fed 110.

In particular, the control circuit 125 of each device to be fed 110 can be provided with an encoder 395 adapted for applying to the receiving armatures 175 and/or 180 a signal that contains not only the clock signal but also other data coming from the device to be fed 110 (schematically indicated with an arrow in FIG. 15).

The encoder 395 can encode the data for example with encoding such as Manchester differential, biphase mark code (BMC), 8b/10b encoding, 64b/66b encoding, 64b/67b encoding or other. Encoding that ensures a strictly zero average voltage value on the line is particularly advantageous.

At the same time, the control module 325 of each transmission group 135 of the feeding device 105, as well as treating the clock signal to drive the power circuit 155 as described earlier, can be equipped with a decoder 400 adapted for decoding the other data transported by the signal generated by the control circuit 125 of the device to be fed 110, which can then be addressed in a shared bus 410, for example a USB 3.0 bus or an HDMI bus.

The communication can be clearly made two-directional by introducing a second data encoder also on the feeding device 105, and a second decoder on the device to be fed 110.

In order to avoid excessive worsening of the cost of the system, it is possible to foresee for only some transmission groups 135 of the feeding device 105 to be able to receive and/or transmit the data signal, so that most of the transmission groups 135 remain low cost and capable only of managing the transmission of power. Since the data travels at very high frequency (tens of MHz, hundreds of MHz or even GHz), the capacitive coupling of a few transmitting armatures 165 (ideally just one) is indeed sufficient to transmit the data signal, which can then be decoded and routed on a suitable communication bus 410 that makes the data available to all of the devices to be fed 110 arranged on the active surface 160.

In order to avoid electromagnetic pollution, the communication bus 410 can be of a shape and size such as to limit the emissions (therefore it must be sized to operate as a poor antenna) and can be differential, for example consisting of two juxtaposed and close data planes, on which differential signals travel and to which all of the primary circuits equipped with user data interface are connected, and therefore capable both of reading the data from the receiving armatures, sent by the controller arranged on the device to be fed 110, and of sending data to the transmission armatures, useful for being captured by the receiving armatures and decoded by the controller arranged on the device to be fed 110.

According to an aspect common to all of the embodiments described earlier, the transmitting armature 165 of each transmission group 135 could be divided into a plurality of transmitting armatures 165A connected to the same power circuit 155 and to the same signal management circuit 150, for example to reduce the cost per unit surface of the active surface 160.

Figure 16:
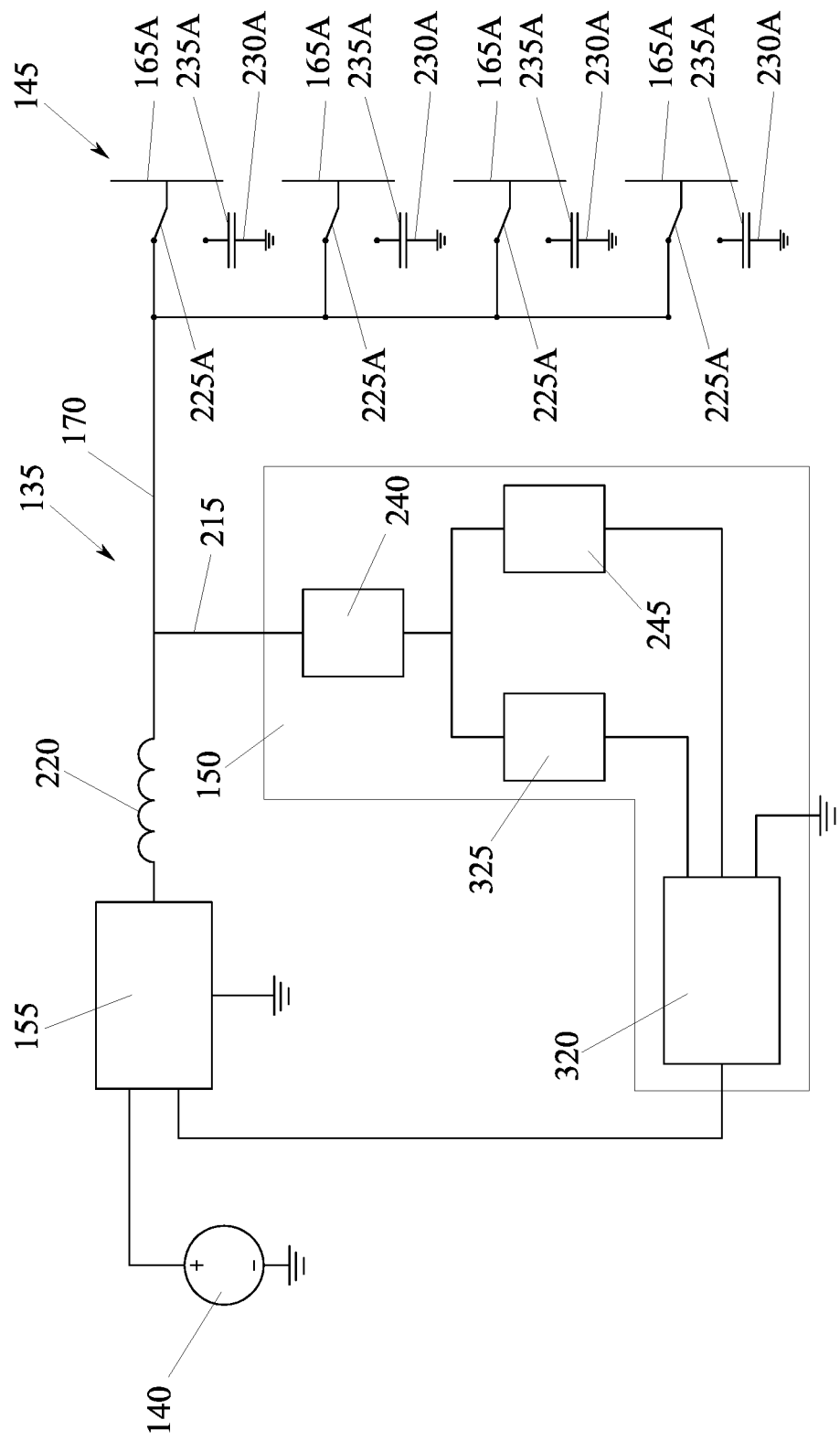

In this case, the circuit diagram of each transmission group 135 remains substantially unchanged, but each transmission armature 165A can be connected to the electrical branch 170 through a respective activation switch 225A, as illustrated for example in FIG. 16.

Each activation switch 225A can be selectively switched between a closed configuration, wherein it connects the respective transmitting armature 165A to an electrical branch 230A referred to ground or to another reference potential, and an open configuration, wherein it connects the transmitting armature 165A to the electrical branch 170 that connects to the relative power circuit 155 and to the relative signal management circuit 150.

Possibly, an electrical capacity 235A can be positioned on each electrical branch 230A, for example to create a ground connection between the data circuits arranged on the feeding device 105 and on the device to be fed and/or to control the impedance of the circuit and create a dynamic impedance matching between electrical load 115 and voltage generator 140.

Each activation switch 225A can be controlled by the control circuit of the feeding device 105, which selects which transmitting armatures 165A to connect to the electrical branch 170 as a function of the signals received by the armatures of the device to be fed 110, using a logic similar to what has been described earlier.

For example, the switches can be kept normally in closed position and be periodically brought into open position one after the other in sequence, for example with the help of a timer or of a counter. In this way it is possible to identify whether and which transmission armatures 165A of the sub-group face the first receiving armature 175 of the device to be fed 110, subsequently applying the voltage wave only to those identified whereas all of the others can be kept switched off or connected to the electrical branch 235A.

Thanks to this solution, for the same global dimensions of the active surface 160 of the feeding device 105, it is advantageously possible to increase the number of transmitting armatures 165A reducing the dimensions thereof, thereby obtaining a very precise capacitive coupling with the receiving armatures 175 and 180 of the device to be fed.

On the other hand, for the same global number of transmitting armatures, it is advantageously possible to substantially reduce the number of signal management circuits 150 and of power circuits 155, thereby reducing the overall costs of the system 100.

Of course, the transmitting armatures 165A can have any geometry, possibly even not regular. However, regular geometries such as triangles, circles, rectangles, squares or hexagons can be particularly simple and effective.

Figure 3:
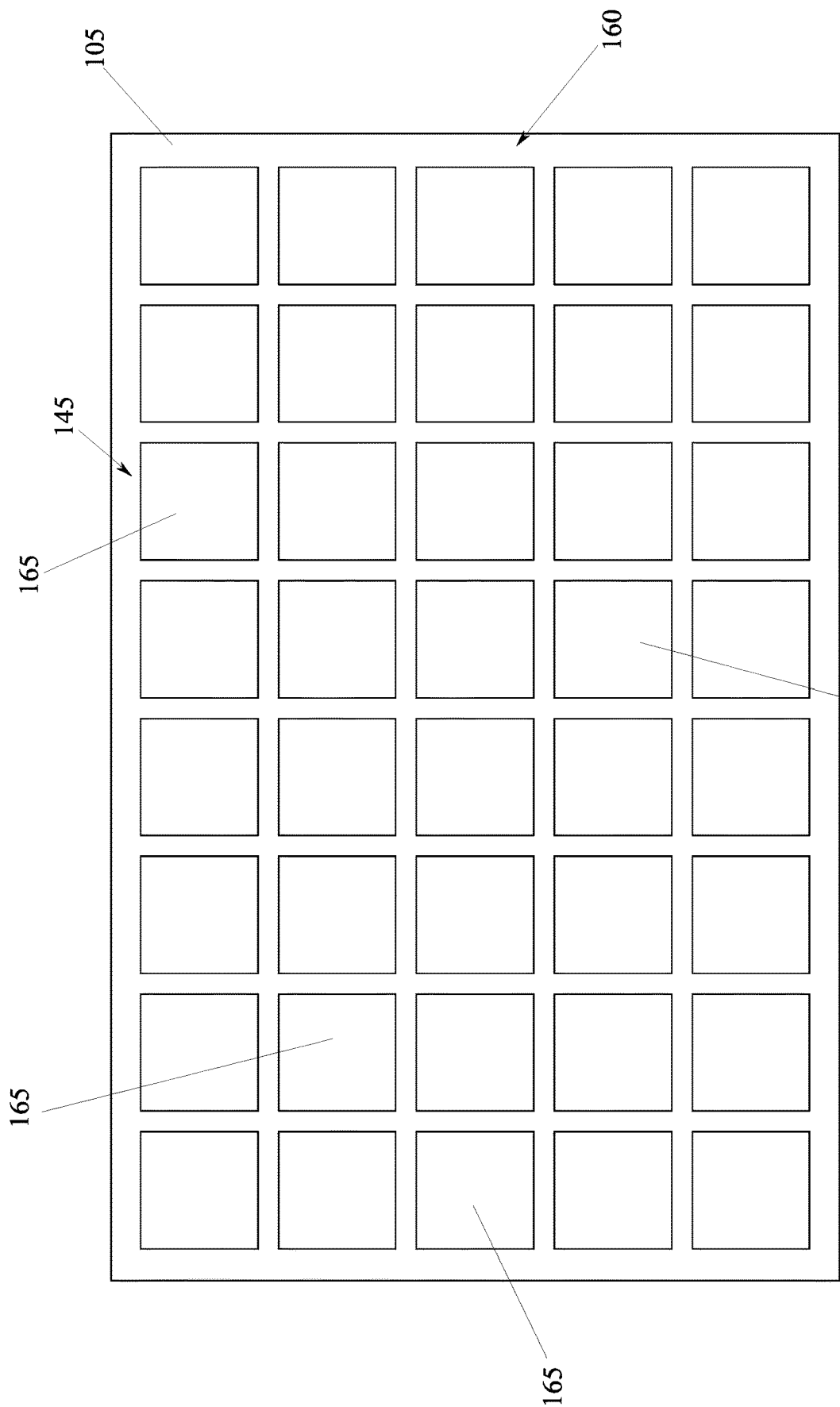
FIGS. 3, 17, 19 and 27 are a view from above of an active surface of a feeding device according to different embodiments of the present invention.
Figure 17:
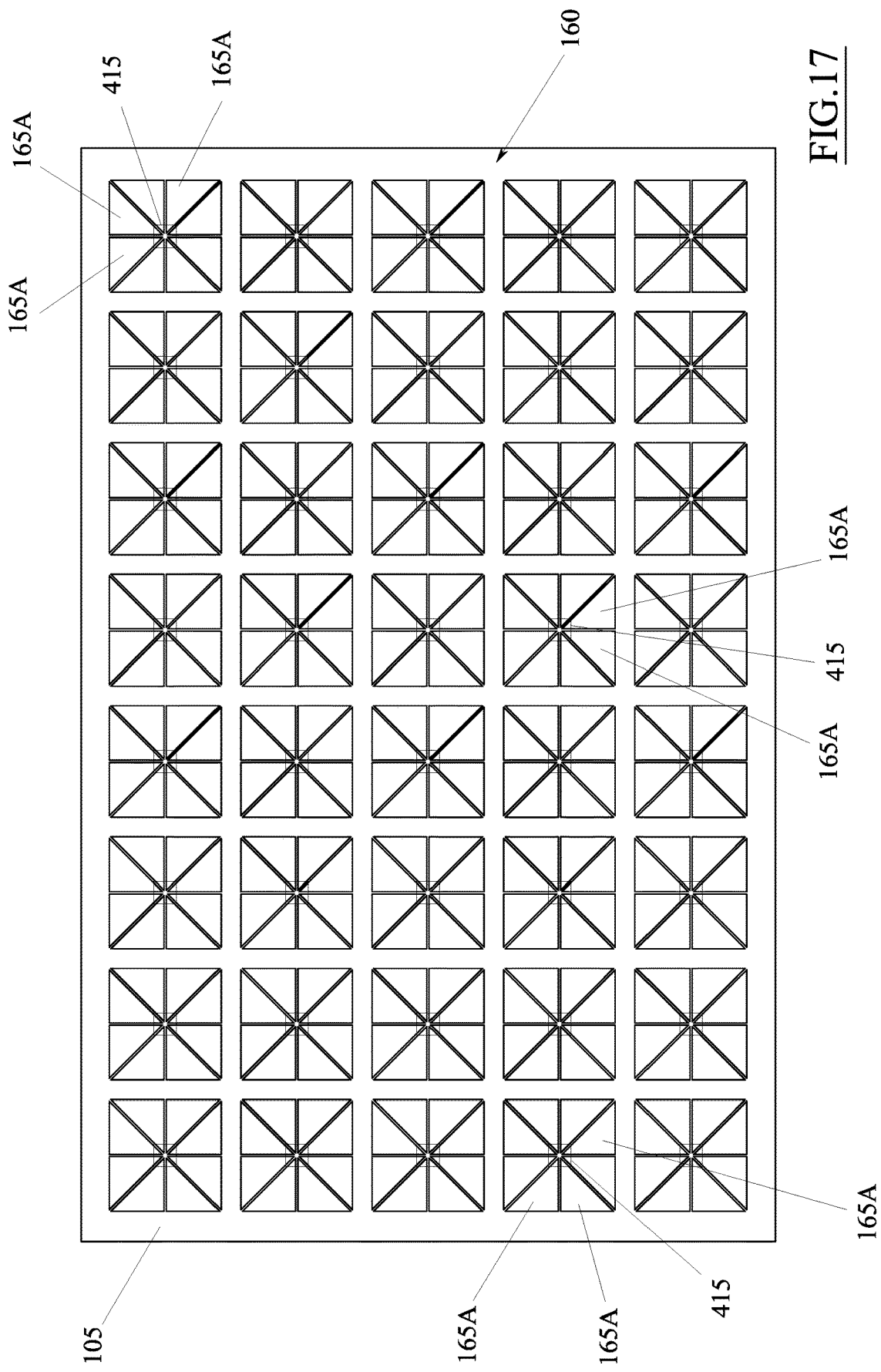

In particular, a particularly advantageous embodiment (even if not exclusive) substantially foresees to replace each of the transmitting armatures 165 illustrated in FIG. 3, with a group of transmitting armatures 165A of triangular shape but mutually arranged so as to recreate the square/rectangular shape of the transmitting armature 165, for example as illustrated in FIG. 17 where each transmitting armature 165 is divided along the diagonals and the bisectors in a group of eight transmitting armatures 165A.

The signal management circuit 150 and the power circuit 155 connected to each group of transmitting armatures 165A can be made in the form of a chip 415 arranged at the centre of the rectangle/square, so as to be substantially equidistant from each transmitting armature 165A of the group and therefore minimise problems linked to distributed parasitic reactances.

The triangular shape of the transmitting armatures 165A makes it possible to better approximate the shape of the devices to be fed 110 (typically rectangular) which are positioned at random on the active surface 160, thus potentially misaligned with respect to the sides of a square. By virtue of the diagonals at 45 degrees it is indeed more probable to find a configuration of transmission armatures 165A that better approximates the receiving armatures 175 and 180. This configuration therefore prevents parts of transmitting armatures 165 of FIG. 3 being activated whilst not being completely covered by a receiving armature 175 or 180, reducing the losses.

Figure 18:
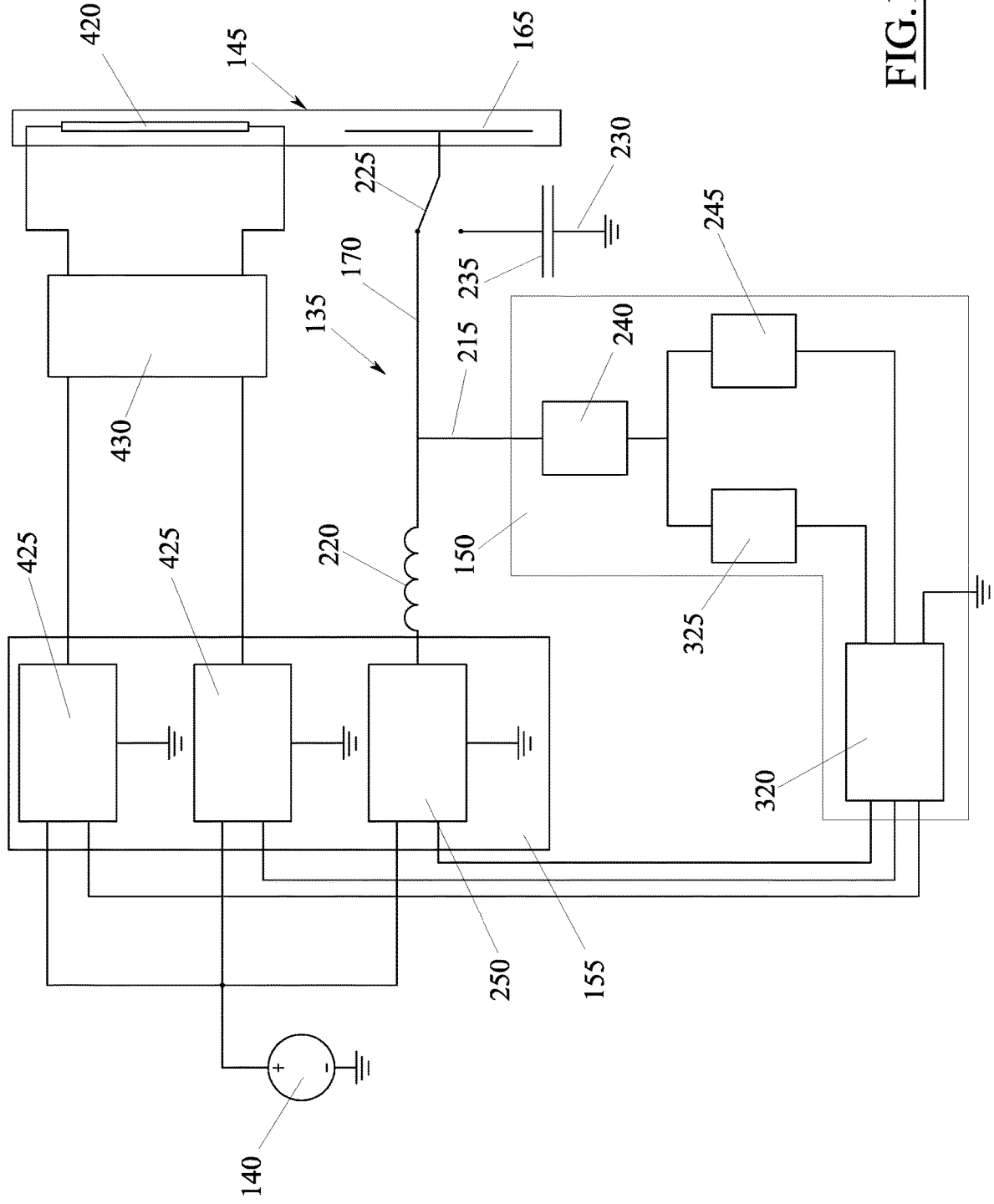

Another aspect common to all of the embodiments described earlier foresees that the transmitting apparatus 145 of each transmission group 135 can further comprise one or more inductive transmitting elements 420, each of which is connected to the same signal management circuit 150 and to the same power circuit 155 of the corresponding transmitting armature 165, as illustrated for example in FIG. 18.

In this way, it is indeed possible to obtain a hybrid capacitive and inductive power transmission system.

Each transmitting inductive element 420 can be made from one or more conducting elements having a mainly inductive behaviour, like for example one or more rectilinear inductive strips that can be positioned coplanar beside the transmitting armature 165.

Figure 19:
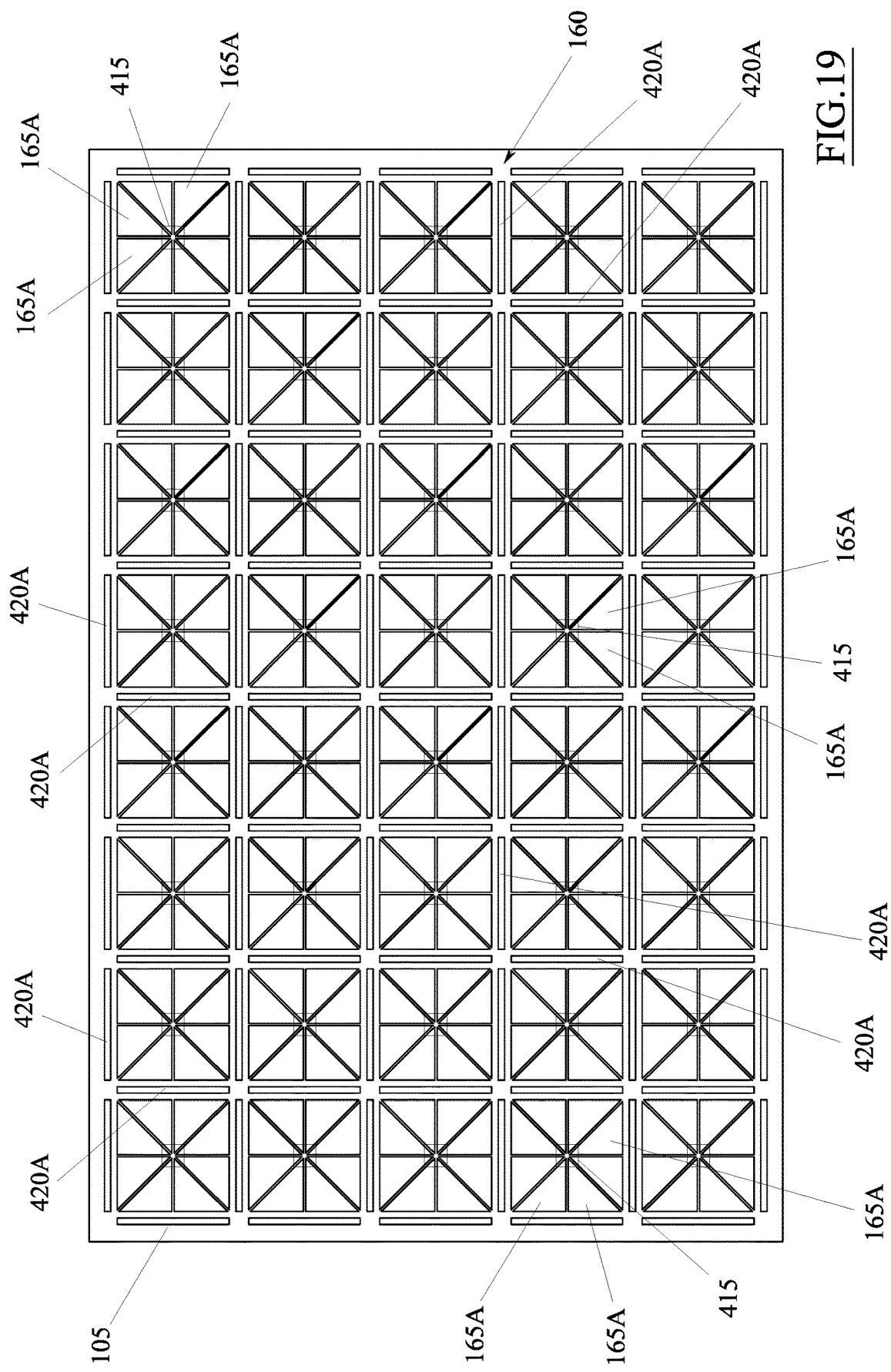

For example, considering the case in which the transmitting armature 165 has a rectangular or square shape, or is divided into transmitting armatures 165A arranged to form a square or a rectangle, each transmission group 135 can comprise an inductive strip 420A arranged coplanar beside a side of the square or rectangle and extending parallel to it, as illustrated for example in FIG. 19. In this way, between each pair of consecutive transmitting armatures 165 (or groups of transmitting armatures 165A) at least one inductive strip 420A is also arranged and each transmitting armature 165 (or group of transmitting armatures 165A) is surrounded on all sides by a set of inductive strips 420A. It should be emphasised how the particular implementation shown, which is only one of those possible, achieves the advantage of making a homogeneous matrix distribution also of the inductive strips 420A on the active surface 160.

Of course, this does not however rule out the possibility that the inductive transmitting elements 420 can be made from inductive conductors having the shape of a coil or transmission antennae, for example a single coil that surrounds the corresponding transmitting armature 165 (or group of transmitting armatures 165A).

Going back to FIG. 18, for each transmitting inductor 420, the power circuit 155 can comprise two further switching circuits 425, substantially of the same type as the switching circuit 250 associated with the transmitting armature 165, which are adapted for connecting the voltage generator 140 to the transmitting inductor 420.

These switching circuits 425 are driven with the pilot signal coming out from the signal management circuit 150 so as to convert the feeding voltage produced by the voltage generator 140 into an alternating voltage wave, typically at high frequency (hundreds of kHz, MHz, tens of MHz or even hundreds of MHz), which is applied to the transmitting inductive element 420. A suitable matching network can be arranged between the switching circuits 425 and the transmitting inductor 420.

Figure 20:
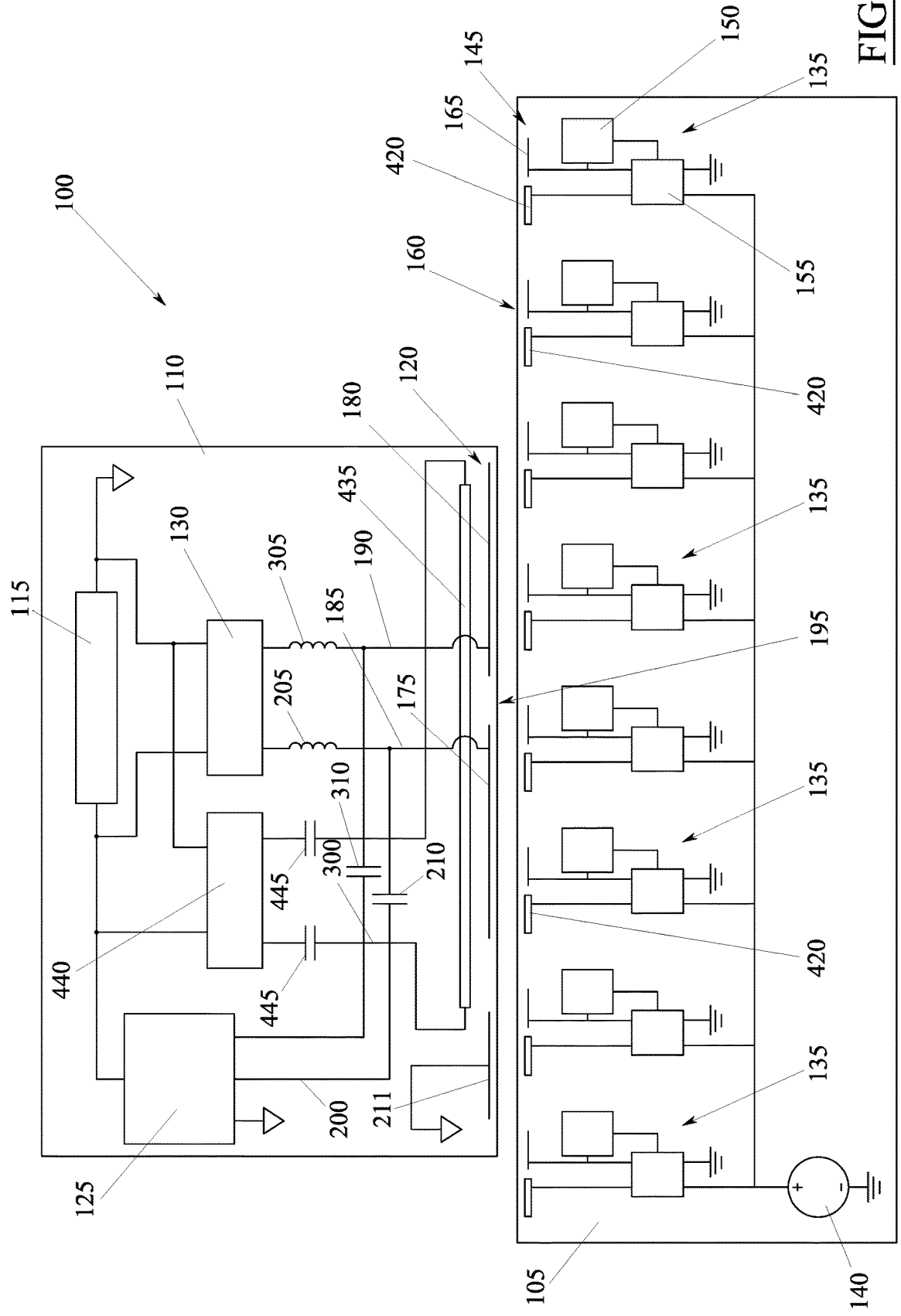

As illustrated in FIG. 20, the receiving apparatus 120 of the device to be fed 110 can correspondingly comprise at least one inductive receiving element 435 adapted for making an inductive coupling with one or more inductive transmitting elements 420 of the device to be fed 110.

In general, the number, shape, size and arrangement of the inductive receiving elements 435 must be selected so that, by resting or bringing the receiving surface 195 of the device to be fed 110 towards the active surface 160 of the feeding device 105, it is possible to create an inductive coupling between at least one inductive receiving element 435 and at least one transmitting inductive element 420 of the feeding device 105, preferably between each inductive receiving element 435 and a plurality of inductive transmitting elements 420 arranged so as to reproduce, with good approximation, the shape and size, for multiple positions and/or relative orientations of the device to be fed 110 with respect to the feeding device 105, preferably for any position and/or orientation of the device to be fed 110.

Figure 21:
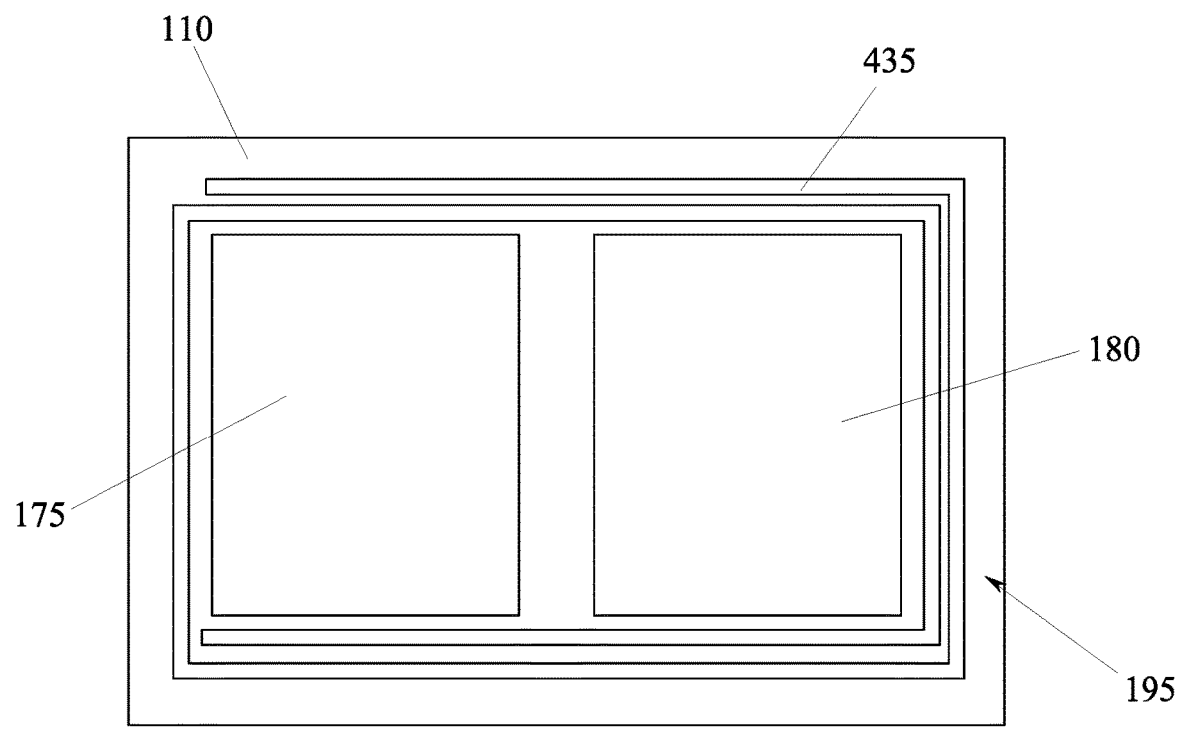
FIGS. 21 and 24 show a plan view from below of a receiving surface of a device to be fed according to different embodiments of the invention.

According to an embodiment, the inductive receiving element 435 can be made from an inductive conductor having the shape of a coil or receiving antenna. For example, the receiving apparatus 120 could comprise an inductive receiving element 435 shaped like a coil that extends coplanar around both of the receiving armatures 175 and 180, as illustrated in FIG. 21.

This inductive receiving element 435 can be connected to the electrical load 115 independently with respect to the receiving armatures 175 and 180, for example through a second rectifier 440 (see FIG. 20).

In series between the receiving inductor 435 and the second rectifier 440, it is possible to insert capacities 445 useful for creating a resonator that can also allow the inductive receiving part to operate in ZVS (zero voltage switching) or ZCS (zero current switching) mode.

Alternatively, instead of the capacities 445 in series, it is possible to insert a capacity 450 in parallel to the inductive receiving element 435 (see FIG. 22), useful for forming a resonant tank that can facilitate the coupling with a resonant primary inductive circuit even at greater distances between transmitting inductive element 420 and receiver 435 with respect to the series resonant circuit.

In order to transfer electrical power through the inductive coupling between the inductive receiving element 435 and each transmitting inductive element 420 connected to it, it is sufficient for the two switching circuits 425 arranged at the ends of the transmitting inductive element 420 to be driven at the same frequency, through the pilot signal generated by the signal management circuit 150, but in counter-phase with each other.

This solution is particularly advantageous when the signal management circuit 150 is already configured to provide two clock signals in counter-phase, like for example in the solution of FIG. 10, since the switching circuits 425 of the receiving inductor 435 can be driven with the same signals already available to drive the switching circuit 250 of the transmitting armature 165, with a control system that is therefore particularly advantageous, simple and functional.

Alternatively, it is sufficient for one of the switching circuits 425 to be driven with any phase and for the other to be commanded so as to keep the second end of the transmitting inductive element 420 constantly connected to a reference potential, for example to a suitable ground.

Thanks to both of the proposed solutions, the transmitting inductive element 420 is crossed by a voltage wave that transfers to the inductive receiving element 435 in an inductive magnetic manner and can thus be used to feed the electrical load 115 through the rectifier 440.

The outputs of the two rectifiers 130 and 440 feed the electrical load 115 independently, ensuring a substantially autonomous operation of the inductive receiving part and of the capacitive receiving part.

It should be emphasised that, as a function of the requirements in terms of power necessary for the electrical load 115, simplicity of the circuit, efficiency, distance from the transmitter and shape of the device to be fed it is possible to implement a solely inductive or solely capacitive receiver without this constituting a substantial modification of the solution proposed.

Figure 23:
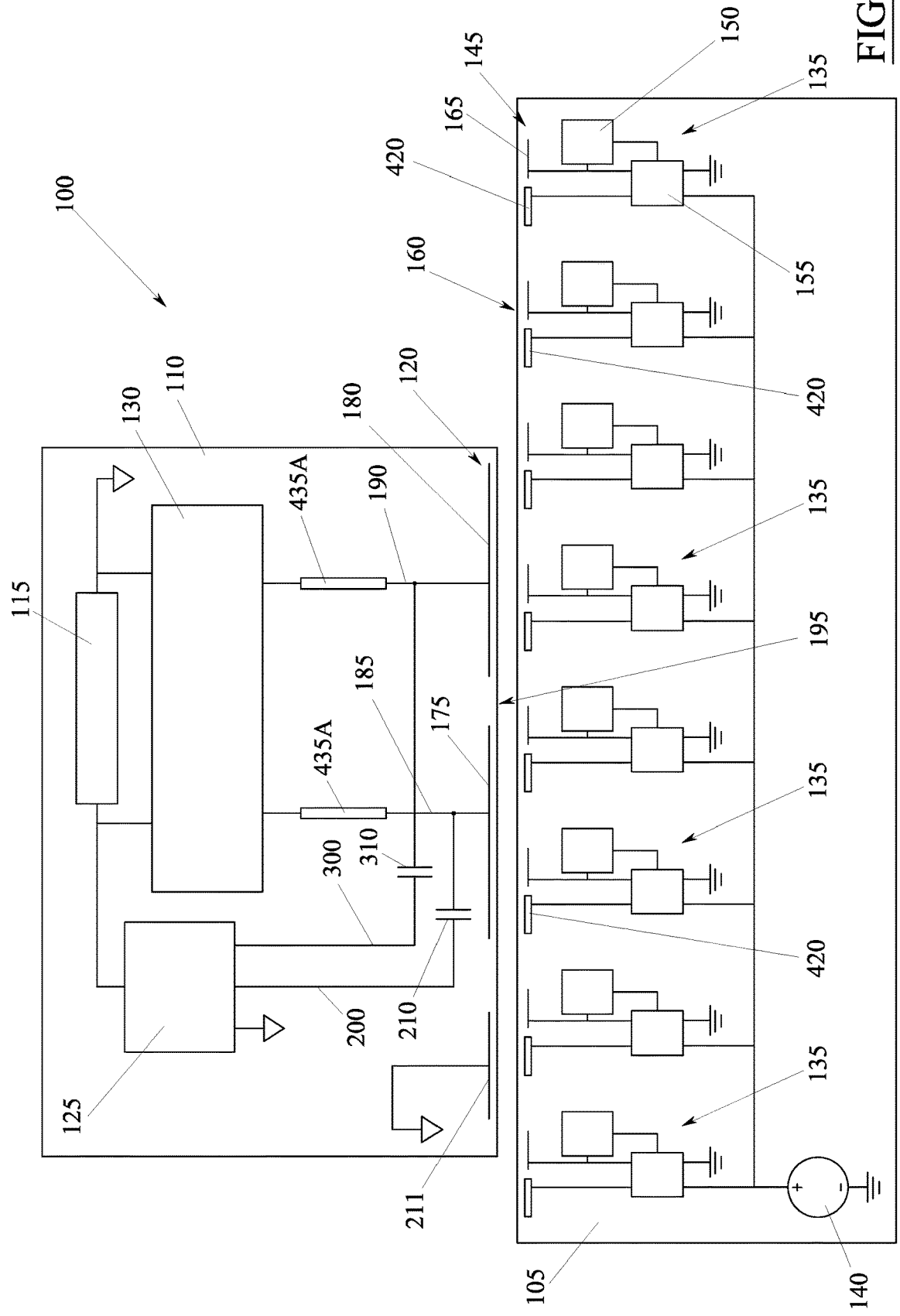

A particularly advantageous variant of the circuit proposed is given in FIG. 23. In this specific implementation, the device to be fed 110 comprises only the rectifier 130 on which both the inductive part and the capacitive part act synergically.

This is obtained by replacing the inductive receiving element 435 with two distinct inductive receiving elements 435A, one of which is inserted on the electrical branch 185 in series between the first receiving armature 175 and the rectifier 130 whereas the other is inserted on the electrical branch 190 in series between the rectifier 130 and the second receiving armature 180. Each of these inductive receiving elements 435A can be configured like a coil that extends for example coplanar respectively around the first receiving armature 175 and the second receiving armature 180, as illustrated for example in FIG. 24.

In this way, the inductive receiving elements 435A have multiple functions: series inductance useful for forming the LC resonator of the power circuit, inductive receiving elements, useful for increasing the power transmitted to the electrical load 115 adding to the power receive in a capacitive manner that received in an inductive manner, and low pass filters useful for preventing the signals injected by the control circuit from interacting with the load.

This implementation is particularly advantageous since it minimises the number of components necessary, the bulk and the costs connected to the device to be fed 110, at the same time increasing the versatility of the system and the power that can be transmitted.

In order to transfer electrical power through the inductive coupling between the inductive receiving elements 435A and each transmitting inductive element 420 connected to them, the two switching circuits 425 arranged at the ends of the transmitting inductive element 420 can be driven in the same way described earlier.

However, the condition so that such a system operates correctly is that the voltage waves received by the receiving armatures 175 and 180 and the voltage waves induced by the magnetic coupling between inductive transmitting elements 420 and inductive receiving elements 435A have suitable phases and impedances.

In particular, since the inductive receiving elements 435A and the receiving armatures 175 and 180 are all connected to the same rectifier 130, the excitation voltage of the inductive transmitting elements 420 must be selected so as to ensure a synergic operation of the waves induced on the inductive receiving elements 435A and on the receiving armatures 175.

Of course, also in this case the selective activation of the transmission groups 135 can be controlled with a suitable control of the activation switches 225.

As an alternative to this methodology, a synergic data exchange can be foreseen on both of the inductive and capacitive branches, wherein the inductive branch allows the transmission by the control circuit 125 arranged on the device to be fed 110 of a simple initial handshake to the control circuit 125 arranged on the transmission group 135, since typically the branch based on inductive coupling has a low pass or band pass characteristic with band centre at relatively low frequencies (those of the power transmission). Once the handshake has been received through an inductive circuit, the control module 322 can open the activation switch 225 that connects the transmitting armature 165 to the signal management circuit 150, therefore allowing data to be received at very high frequency and therefore at high bitrate on the capacitive channel. In some cases, it may be advantageous to use the capacitive coupling exclusively for a data stream, leaving the power transfer to the inductive coupling.

Figure 25:
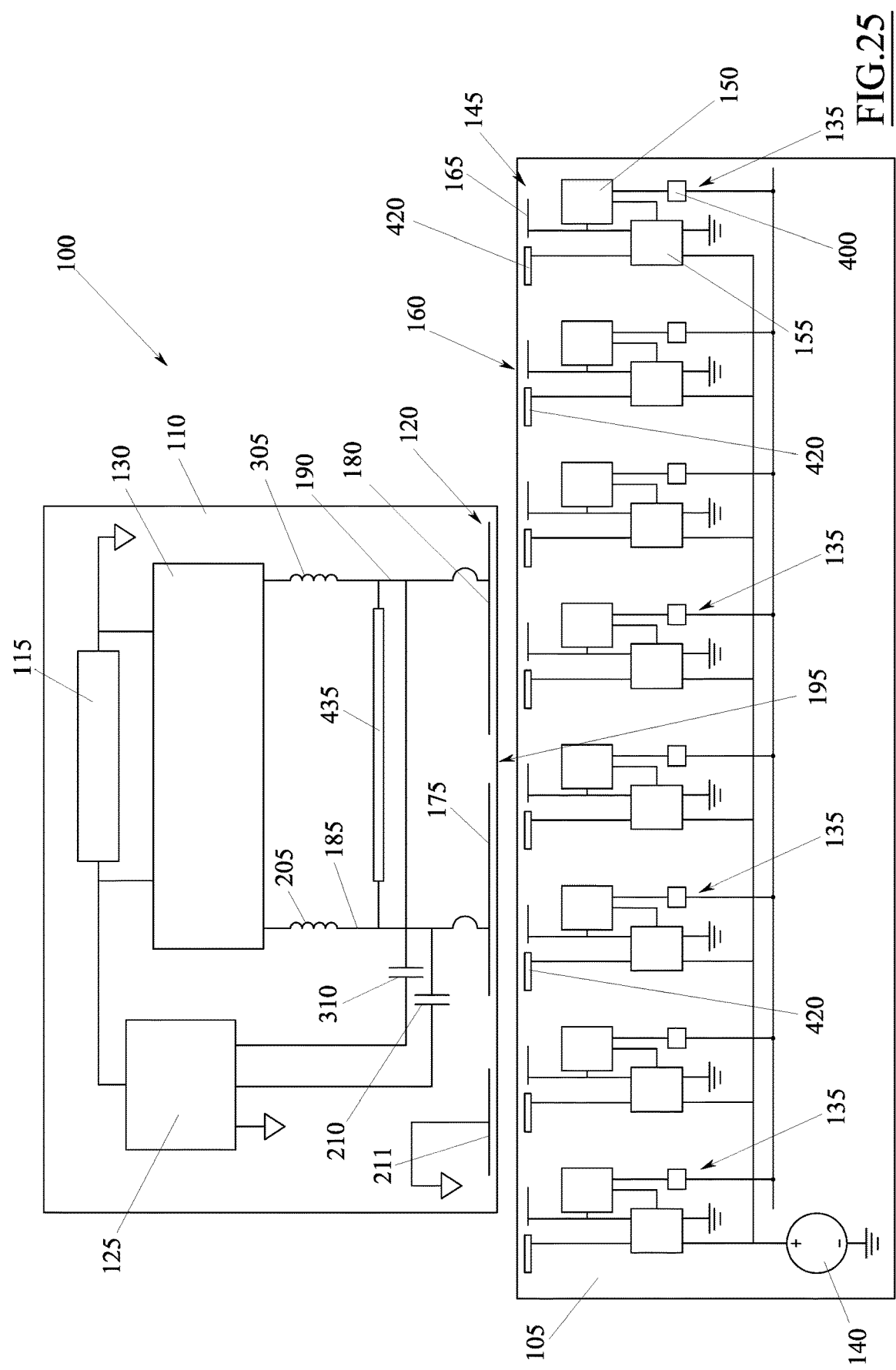

FIG. 25 illustrates another variant that allows the device to be fed 110 to comprise a single rectifier 130 on which both the inductive part and the capacitive part act synergically.

This further variant foresees to connect the inductive receiving element 435 in parallel to the receiving armatures 175 and 180, for example connecting a first end of the inductive element 435 to the electrical branch 185 that connects the rectifier 130 to the first receiving armature 175, and the second end of the inductive element 435 to the electrical branch 190 that connects the rectifier 130 to the second receiving armature 180.

In this case, it may be advantageous to also insert the series inductors 205 and 305 useful for preventing the data exchange system 125 from interacting with the load 115, wherein the inductor 205 can be inserted on the electrical branch 185 between the rectifier 130 and the connection node with the inductive receiving element 435 whereas the inductor 305 can be inserted on the electrical branch 190 between the rectifier 130 and the connection node with the inductive receiving element 435.

Figure 24:
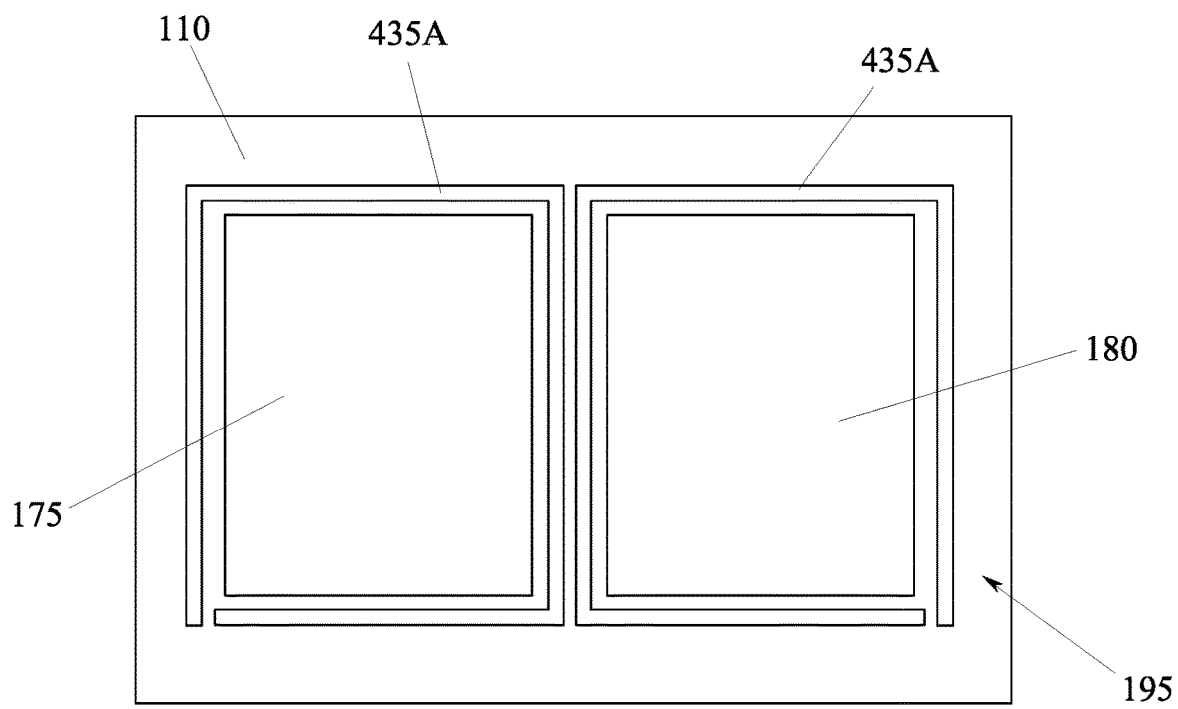
Figure 22:
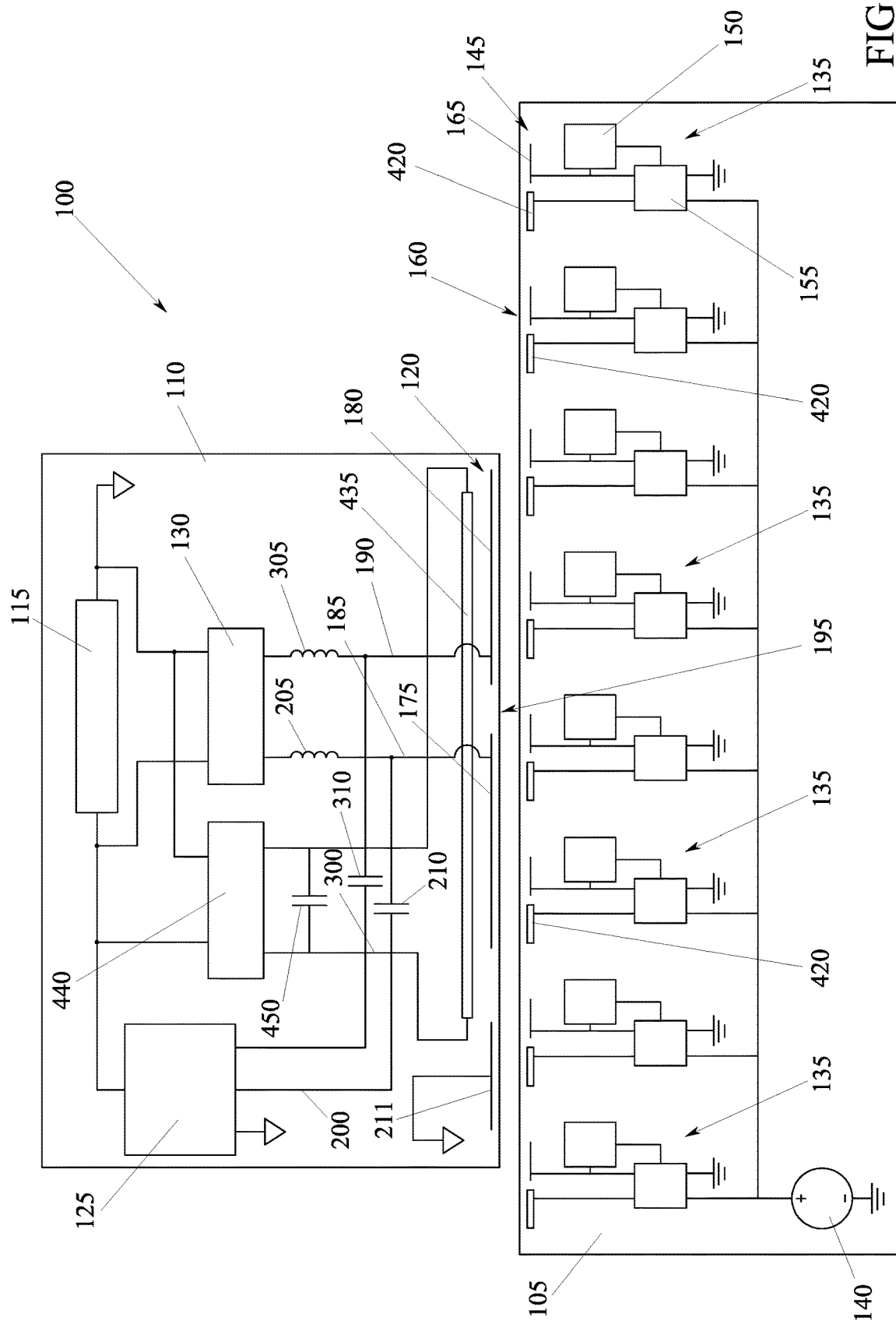

It should also be specified that some embodiments could foresee a hybrid solution between those illustrated in FIGS. 22 and 24, i.e. wherein the device to be fed 110 comprises both the series inductive elements 435A illustrated in FIG. 22 and also the parallel inductive element 435 illustrated in FIG. 24. According to a variant applicable to all of the embodiments described above, or at least to all of those that foresee the possibility of making a hybrid inductive/capacitive coupling, each transmission group 135 can be made as indicated in FIG. 26.

With respect to the embodiment illustrated in FIG. 4 and thereafter, this embodiment foresees that the transmitting inductive element 420 is arranged on the electrical branch 170, in series between the relative switching circuit 250 and the relative transmitting armature 165.

In practice, this embodiment foresees to replace the inductance 220 already foreseen in the embodiments of FIG. 4 and thereafter directly with the inductive element 420.

Figure 26:
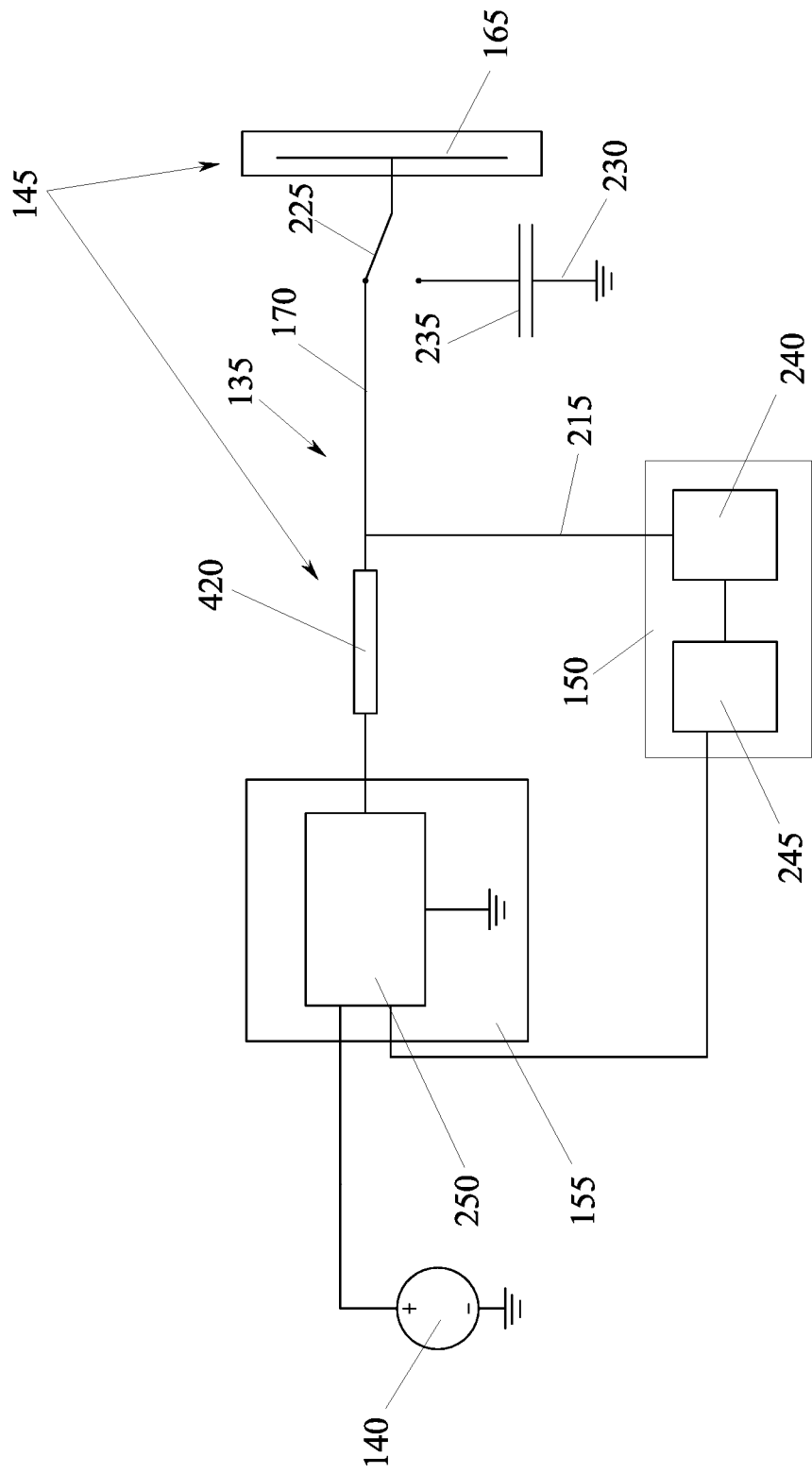
Figure 27:
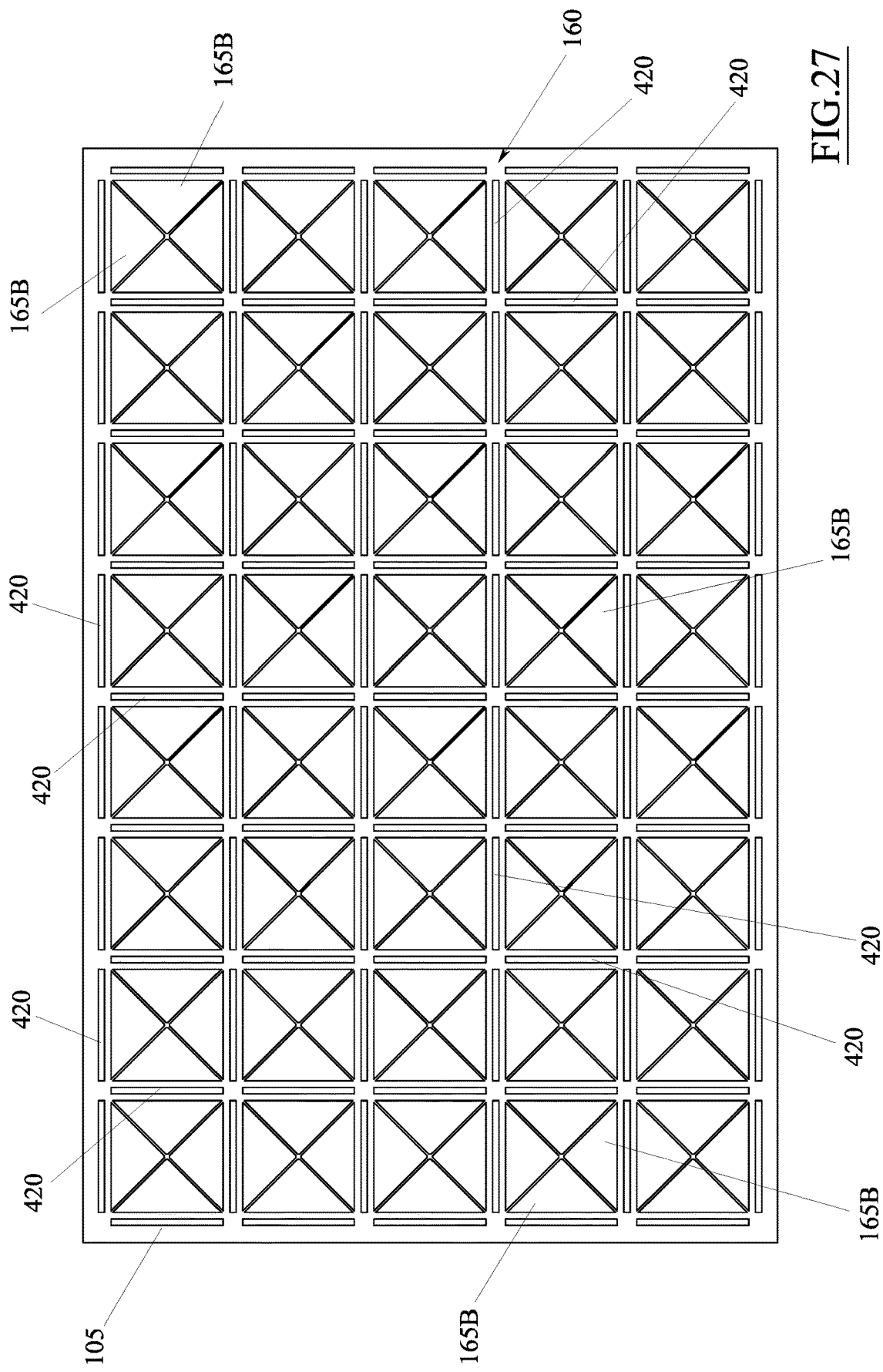

By exploiting the circuit solution of FIG. 26, a preferred embodiment of the system 100 finally foresees that each of the transmitting armatures 165 illustrated in FIG. 3 can be replaced by a group of transmitting armatures 165B, for example a group of four transmitting armatures 165B for example having a substantially triangular shape as illustrated in FIG. 27, where each transmitting armature 165B is associated with a respective transmitting inductive element 420, for example with the one adjacent to it, to define the transmitting apparatus 145 of a single transmission group 135 with it.

Of course, this division of the transmitting armatures 165 could also be adopted in the case in which the transmission groups are made according to the embodiment of FIG. 4 and thereafter.

It should be noted how the embodiments that use transmission groups 135 with transmitting apparatuses 145 of the hybrid capacitive/inductive type allow a great versatility of use.

In particular, with a single feeding device 105 it is possible to create many recharging couplings with multiple different devices to be fed 110, arranged at different distances, based on different receiving principles, for example capacitive, inductive, magnetic resonant, RF, etc., on different and independent operating frequencies, also by virtue of the possibility of inserting a suitable passive or active matching network on a secondary circuit and/or on a circuit of the feeding device 105.

If, for example, the distance between feeding device 105 and device to be fed 110 is very short (e.g. laptop or mobile telephone resting directly on the active surface 160 of the feeding device 105), the system can advantageously and preferably exploit the capacitive coupling, and possibly exploit the inductive coupling only as a further power contribution.

Vice-versa, over greater distances the inductive coupling may be advantageous, and as the distance increases it may be useful to reconfigure the system dynamically to operate through magnetic resonant coupling, and at even greater distances to act as transmission antenna coupled with one or more receiving antennae.

This therefore makes it possible to carry out the power transfer not only for any position of the device to be fed 110 on the active surface 160, but also for various distances in the orthogonal/vertical direction (from a few cm to a few metres), also dynamically changing the type of preferential coupling between capacitive, inductive, magnetic resonant and/or based on antennae. It should also be emphasised that the transmission elements, both inductive and capacitive, in particular at high distance, can be exploited as multiple antennae driven at high frequencies, for example RF, such as to generate constructive and destructive interferences in space useful for example for reaching target antennae with particularly precise directional beams.

It should also be emphasised how the systems for controlling the transmission groups 135 are capable of activating only the transmitting armatures 165 and the inductive transmitting elements 420 that are close to the receiving armatures 175 and 180 and the receiving inductor 435/435A, very effectively approximating the shape of the device to be fed 110.

It should also be emphasised how the presence of transmission groups 135 having transmitting apparatuses 145 of the hybrid capacitive/inductive type can also be compatible with devices to be fed 110 having only inductive or only capacitive receiving apparatuses, and that as a function of the size and number of transmitters and receivers it is possible to change the operating frequency of the system from hundreds of kHz up to GHz.

The proposed system is therefore particularly suitable for wirelessly transmitting high power and signals at high speed through an active surface 160 based on capacitive/inductive coupling, based on antennae or hybrid. The active surface 160 can be made up of a matrix of transmission apparatuses 145 consisting of transmitting armatures 165 and inductive transmitting elements 420 which are commanded by suitable power circuits 155 and signal management circuits 150. When devices to be fed 110, for example smartphones, laptops, displays, computers and televisions are brought close to the active surface 160, the receiving armatures 175 and 180 inserted in the device to be fed 110, typically of greater size with respect to the transmitting armatures 165, determine capacities with the latter through which power and data can be transmitted even simultaneously. Simultaneously, inductive couplings can also be created between the corresponding inductive receiving elements 435/435A and transmitting elements 420, with the advantage with respect to known techniques of also being able to create for the inductive transmission a transmission circuit that can be dynamically reconfigured as a function of the shape and the impedance of the inductive receiving circuit.

It is particularly relevant to highlight how, to further reduce to industrialisation cost, any embodiment of the feeding device 105 described above can be made using techniques based on thin film (TFT) like those successfully exploited in the world of LCD displays. Through such techniques it is possible to design the active components, and in particular the power switch useful for driving each armature, for example type N mosfet, directly on the substrate, substantially reducing the cost of the system.

Similarly, it is possible to design the passive components (in particular the inductances and the capacities) directly in the conductive layers of which the film consists. In this way, the feeding device 105 becomes a sort of mat or thin film that is extremely simple to feed, cuttable, flexible and commanded by extremely cost-effective integrated circuits, since the entire power circuitry (switches and passive elements) and a lot of the signal circuitry (in particular but not exclusively passive elements and filter) are designed substantially at zero cost on the conductive layers.

This mat or thin film is therefore easy to insert in items of furniture such as tables, walls, desks, miscellaneous furniture or floors, and makes it possible, in a cost-effective and efficient manner, to wirelessly feed and interconnect devices such as displays, televisions, computers, laptops, smartphones, tablets, wearable devices, home appliances, and any other electrical and electronic device.

Of course, those skilled in the art can bring numerous technical/application modifications to what has been described above, without for this reason departing from the scope of the invention as claimed below.

The invention claimed is:

1. A system (100) for wirelessly transferring electrical power to an electrical load (115) comprising:
   a feeding device (105) and
   a device to be fed (110) physically separate and independent from the feeding device,
   wherein the device to be fed (110) comprises:
   the electrical load to be fed,
   a control circuit (125) adapted for generating a clock signal, and
   a receiving apparatus (120) of the electrical power connected to the electrical load (115),
   and wherein the feeding device (105) comprises at least one transmission group (135) of the electrical power that includes:
   a transmitting apparatus (145) adapted for making a non-conductive magnetic and/or electric coupling with the receiving apparatus (120) of the device to be fed (110),
   a signal management circuit (150) adapted for receiving the clock signal generated by the control circuit (125) of the device to be fed (110) and for generating a pilot signal having a frequency proportional to the frequency of the clock signal, and
   a power circuit (155) adapted for receiving the pilot signal generated by the signal management circuit (150) and for applying to the transmitting apparatus (145) a voltage wave that is periodically variable over time with a frequency equal to the frequency of the pilot signal.

2. A system (100) according to claim 1, the feeding device (105) comprising a plurality of transmission groups (135).

3. A system (100) according to claim 2, wherein the transmitting apparatus (145) of each transmission group (135) comprises:
   at least one transmitting armature (165) connected to the corresponding power circuit (155) and to the corresponding signal management circuit (150),
   and wherein the receiving apparatus (120) of the device to be fed (110) com-prises:
   a first receiving armature (175) adapted for facing the transmitting armature (165) of a first transmission group (135) to make a first electrical capacity, a second receiving armature (180) adapted for facing the transmitting armature (165) of a second transmission group (135) to make a second electrical capacity.

4. A system (100) according to claim 3, wherein the control circuit (125) of the device to be fed (110) is connected to the first receiving armature (175) to apply the clock signal to said first receiving armature, and wherein the signal management circuit (150) of each transmission group (135) is connected to the corresponding transmitting armature (165) so as to be able to receive the clock signal.

5. A system (100) according to claim 4, wherein the device to be fed comprises:
   an inductance (205) connected in series between the first receiving armature (175) and the electrical load (115), and
   a capacity (210) connected in series between the first receiving armature (175) and the control circuit (125).

6. A system (100) according to claim 4, wherein each transmission group (135) of the feeding device (105) comprises an inductance (220) connected in series between the corresponding power circuit (155) and the corresponding transmitting armature (165).

7. A system (100) according to claim 3, wherein each transmission group (135) of the feeding device (105) comprises an activation switch (225) adapted for selectively connecting the transmitting armature (165) to the corresponding power circuit (155) and to the corresponding signal management circuit (150) or to a reference potential.

8. A system (100) according to claim 3, wherein each transmission group (135) of the feeding device (105) comprises a plurality of transmitting armatures (165A) connected to the same power circuit (155) and to the same signal management circuit (150).

9. A system (100) according to claim 1, wherein the transmitting apparatus (145) of each transmission group (135) comprises:
   at least one transmitting inductive element (420) connected to the power circuit (155),
   and wherein the receiving apparatus (120) of the device to be fed (110) comprises:
   at least one receiving inductive element (435) connected to the electrical load (115) and adapted for making an inductive coupling with the transmitting inductive element (420) of the transmission group (135).

10. A system (100) according to claim 1, wherein the power circuit (155) of each transmission group (135) comprises at least one switching circuit (250) adapted for receiving the pilot signal generated by the signal management circuit (150) and for connecting the transmitting apparatus (145) to a voltage generator (140) in an intermittent and periodic manner, with a frequency equal to the frequency of the pilot signal.

11. A system (100) according to claim 10, wherein the switching circuit (250) comprises a pair of electrical switches (255, 260) connected in series between the voltage generator (140) and a reference potential, a central node (265) connected to the transmitting apparatus (145) being comprised between said switches.

12. A system (100) according to claim 10, wherein the switching circuit (250) comprises an inductance (275) and a switch (280) connected in series between the voltage generator (140) and a reference potential, a central node (285) connected to the transmitting apparatus (145) being comprised between said inductance and said inductor.

13. A system (100) according to claim 1, wherein the signal management circuit (150) comprises a high pass filter (240) to filter the clock signal.

14. A system (100) according to claim 1, wherein the signal management circuit (150) comprises a frequency divider (245) to reduce the frequency of the clock signal.

15. A system (100) according to claim 3, wherein the control circuit (125) of the device to be fed (110) is adapted for generating and for applying a second clock signal to the second receiving armature (180).

16. A system (100) according to claim 15, wherein the signal management circuit (150) of each transmission group (135) comprises:
   a module (315) for generating a signal in counter-phase with respect to the clock signal, and
   a control module (325) adapted for selecting as pilot signal the clock signal or the counter-phase signal.

17. A system (100) according to claim 16, wherein the control module (325) is connected to a sensor (380) adapted for generating a position signal indicative of the relative position of the device to be fed (110) and is configured to select the pilot signal based on said position signal.

18. A system (100) according to claim 16, wherein the control module (325) is configured to measure the value of a parameter indicative of a characteristic magnitude of the clock signal, to compare the measured value with a reference value of said parameter and to select the pilot signal according to whether the reference value is higher or lower than the reference value.

19. A system (100) according to claim 18, wherein said characteristic magnitude of the clock signal is selected from the group consisting of: the duty cycle of the clock signal, the amplitude of the clock signal and the frequency of the clock signal.

* * * * *